United States Patent
Liu et al.

(10) Patent No.: US 7,103,910 B1
(45) Date of Patent: Sep. 5, 2006

(54) METHOD AND APPARATUS FOR VERIFYING THE LEGITIMACY OF AN UNTRUSTED MECHANISM

(75) Inventors: Sharon S. Liu, Cupertino, CA (US); Jan Luehe, San Francisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/483,726

(22) Filed: Jan. 14, 2000

Related U.S. Application Data

(60) Provisional application No. 60/166,871, filed on Nov. 22, 1999.

(51) Int. Cl.
*G06K 9/00* (2006.01)
*H04L 9/00* (2006.01)

(52) U.S. Cl. .......................................... 726/2; 713/168

(58) Field of Classification Search ........ 713/168–170, 713/202, 171–181; 705/50, 51, 62, 75; 726/2, 726/5, 16–17
See application file for complete search history.

(56) References Cited

U.S. PATENT DOCUMENTS

| | | | |
|---|---|---|---|
| 5,493,692 A | 2/1996 | Theimer et al. | |
| 5,555,376 A | 9/1996 | Theimer et al. | |
| 5,649,099 A | 7/1997 | Theimer et al. | |
| 6,209,104 B1 * | 3/2001 | Jalili | 713/202 |
| 6,298,445 B1 * | 10/2001 | Shostack et al. | 713/201 |
| 6,535,980 B1 * | 3/2003 | Kumar et al. | 713/168 |
| 2002/0112171 A1 | 8/2002 | Ginter et al. | |

FOREIGN PATENT DOCUMENTS

WO    WO 98/58322 A2    12/1998

OTHER PUBLICATIONS

Roger S. Pressman, Ph.D., "Software Engineering, A Practitioner's Approach," Fourth Edition, 1982-1987, pp. 1-22 and 549-576.
European Patent Office, "Communication pursuant to Article 96(2) EPC," Aug. 4, 2004, 4 pages.
European Patent Office, "Communication pursuant to Article 96(2) EPC," Aug. 20, 2004, 5 pages.
Current Claims in European patent application, Application No. 00309875.3, 13 pages.
Current Claims in European patent application, Application No. 00309877.9, 11 pages.

(Continued)

*Primary Examiner*—Hosuk Song
*Assistant Examiner*—Paula Klimach
(74) *Attorney, Agent, or Firm*—Hickman Palermo Truong & Becker, LLP

(57) ABSTRACT

The legitimacy of an untrusted mechanism is verified by submitting a first set of information and a second set of information to the untrusted mechanism in an unpredictable sequence. For each submission of either the first set or the second set of information, a response is received from the untrusted mechanism. Each response is tested to determine if the response is correct for the information set submitted. If any of the responses from the untrusted mechanism is incorrect, then it is determined that the untrusted mechanism is not legitimate. Because the submission sequence is unpredictable, it is highly difficult if not impossible for an illegitimate untrusted mechanism to "fake" proper responses. As a result, this verification process provides an effective means for testing and verifying the legitimacy of the untrusted mechanism.

15 Claims, 14 Drawing Sheets

OTHER PUBLICATIONS

FOLDOC Online Dictionary of Computing, "wild card," Jul. 16, 1997, XP-002261382, 1 page.
Simon N. Foley, "A Model for Secure Information Flow," Feb. 1, 1989, IEEE, pp. 248-258.
European Patent Office, "Communication," Nov. 11, 2003, 4 pages.
Current Claims in European patent application no. 00309875.3, 13 pages.
David A. Taylor, "Object-Oriented Inforamtion Systems, Planning and Implementations," 1992, John Wiley and Sons, 369 pages.

* cited by examiner

DEFAULT SET (1)     ALGORITHM NAME: BLOWFISH
        EXEMPTION MECHANISM :
        MAX KEY SIZE : 128 BITS
        OTHER LIMITATION (S) :

(2)     ALGORITHM NAME: DES
        EXEMPTION MECHANISM :
        MAX KEY SIZE : 128 BITS
        OTHER LIMITATION (S) :

(3)     ALGORITHM NAME: RC5
        EXEMPTION MECHANISM :
        MAX KEY SIZE : 64 BITS
        OTHER LIMITATION (S) : 10 ROUNDS

EXEMPT SET (1)     ALGORITHM NAME: BLOWFISH
        EXEMPTION MECHANISM : KEY RECOVERY
        MAX KEY SIZE : 256 BITS
        OTHER LIMITATION (S) :

(2)     ALGORITHM NAME: BLOWFISH
        EXEMPTION MECHANISM : KEY ESCROW
        MAX KEY SIZE : 256 BITS
        OTHER LIMITATION (S) :

Fig. 5

METHOD AND APPARATUS FOR VERIFYING THE LEGITIMACY OF AN UNTRUSTED MECHANISM

This application claims the benefit of U.S. Provisional Application entitled "Exportable Cryptographic Framework", No. 60/166,871, filed Nov. 22, 1999, and U.S. Provisional Application entitled "Exportable Cryptographic Framework", number not yet assigned, filed Jan. 5, 2000. The entire contents of these provisional applications are hereby incorporated by reference.

BACKGROUND

This invention relates generally to computer systems, and more particularly to a method and apparatus for verifying the legitimacy of an untrusted mechanism.

For a number of years, the U.S. Department of Commerce has regulated, and at times, prohibited the exportation of computer programs or applications which implement data encryption algorithms. Currently, computer programs cannot, as a general rule, be exported if they implement encryption algorithms having cryptographic key sizes exceeding a certain number of bits (the specific allowable key size is algorithm-specific). There are certain exceptions to this rule. One exception is that if an exemption mechanism is implemented, the key size, and hence the cryptographic strength of the program, may in some cases be increased. Examples of exemption mechanisms include key escrow, key recovery, and key weakening. Also, certain types of programs are allowed to use larger key sizes than others. For example, current regulations allow health care and financial services applications to use larger key sizes because of the need for increased security (to protect highly sensitive data) in these types of applications. While some applications may enjoy greater latitude than others, all encryption applications are subject to export regulations.

These regulations apply not only to programs which directly implement encryption algorithms, but also to programs which interface with programs that directly implement encryption algorithms. These programs include "framework" programs which provide infrastructure for facilitating interaction between various programs. The framework itself may not implement any encryption algorithm, but it may allow one or more programs which do implement encryption algorithms to interface with or "plug in" to the framework. An example of such a framework is the Java Cryptography Extension to the Java Platform manufactured by Sun Microsystems, Inc. of Palo Alto, Calif. If a framework allows an encryption mechanism to be "plugged in" to the framework, the framework itself will be subject to export regulations. This means that in order to be exportable, the framework needs to ensure that all export regulations are adhered to regardless of the encryption implementation that is plugged in to the framework. In order to do this, the framework needs to have some mechanism for enforcing the necessary restrictions on the encryption implementations.

SUMMARY OF THE INVENTION

In accordance with the present invention, there is provided a mechanism for dynamically constructing customized implementations to enforce restrictions on services. For purposes of the present invention, a service is defined broadly to encompass any functionality requested by and provided to an application, including but not limited to encryption/decryption functionality. In one embodiment, the invention is implemented in a system comprising an application, a general implementation of a particular service, and a framework.

The framework receives from the application a request for an implementation of a particular service, such as an implementation of a particular encryption algorithm. In response, the framework determines what restrictions, if any, need to be imposed on the requested implementation. In one embodiment, the framework determines the restrictions based upon a set of specified limitations and upon permissions, if any, granted to the application. Once the restrictions are determined, the framework dynamically constructs the requested implementation. In one embodiment, the requested implementation is constructed such that it incorporates the general implementation of the service, the restrictions, and enforcement logic for enforcing the restrictions on the general implementation. Since the requested implementation is constructed specifically for the application, it is customized for the application. Thus, the implementation is referred to as the customized implementation.

Once the customized implementation is dynamically constructed, the framework provides the customized implementation to the application. Thereafter, the application invokes the customized implementation directly for services. Since the customized implementation incorporates the restrictions and enforcement logic for enforcing the restrictions, it is not necessary for the application to further interact with the framework. The customized implementation itself will provide the services, and will guarantee that the restrictions are enforced. By dynamically constructing customized implementations in this manner, the framework ensures that the necessary restrictions are enforced on the services provided to the application.

According to one embodiment, as part of the customized implementation construction process, the framework authenticates the general implementation to ensure that it is a proper implementation. To carry out the authentication, the framework relies upon an external digital signature verification mechanism to verify the digital signature of the general implementation. Because the digital signature verification mechanism is external to the framework and hence, is not a "trusted" component, the framework verifies the legitimacy of the untrusted mechanism prior to relying upon the results provided thereby. The present invention provides a process for effectively verifying the legitimacy of the untrusted mechanism.

According to one embodiment, the legitimacy of an untrusted mechanism is verified by submitting a first set of information and a second set of information to the untrusted mechanism in an unpredictable sequence. For each submission of either the first set or the second set of information, a response is received from the untrusted mechanism. Each response is tested to determine if the response is correct for the information set submitted. If any of the responses from the untrusted mechanism is incorrect, then it is determined that the untrusted mechanism is not legitimate. Because the submission sequence is unpredictable, it is highly difficult if not impossible for an illegitimate untrusted mechanism to "fake" proper responses. As a result, this verification process provides an effective means for testing and verifying the legitimacy of the untrusted mechanism.

BRIEF DESCRIPTION OF THE DRAWINGS

FIG. 5 depicts a sample set of limitations including a default set and an exempt set.

DETAILED DESCRIPTION OF EMBODIMENT(S)

Figure 1:
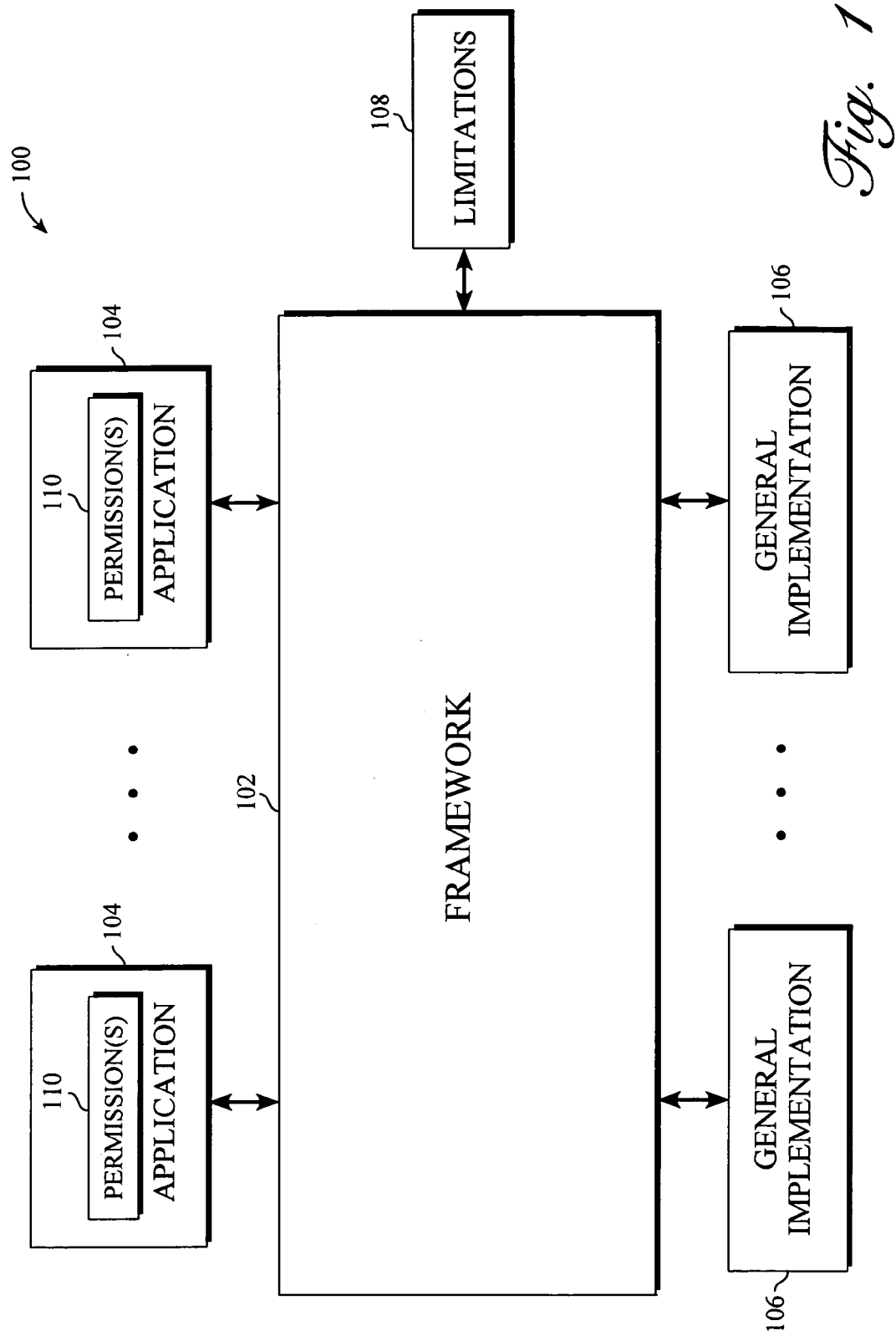
FIG. 1 is a block diagram of an overall system in which one embodiment of the present invention may be implemented.

With reference to FIG. 1, there is shown a block diagram of a system 100 in which one embodiment of the present invention may be implemented, the system 100 comprising one or more applications 104, one or more general implementations 106, a set of specified limitations 108, and a framework 102 for facilitating interaction between the various components. The applications 104, which may be any type of application or program, including but not limited to Java applets, Java applications, and native compiled applications, request and receive implementations of services from the framework 102. For purposes of the present invention, the term "service" is defined broadly to encompass any functionality requested by and provided to an application, including but not limited to encryption/decryption functionality.

When an application 104 requests an implementation from the framework 102, the application 104 specifies the type of service for which it wishes an implementation. For example, the application 104 may request an implementation for the "Blowfish" encryption algorithm. In response, the framework 102 provides an implementation of the requested service to the application 104 which is customized for the application 104 making the request. The customized implementation provided by the framework 102 may contain restrictions on the services that it can provide. As will be discussed later, these restrictions are determined based upon the set of specified limitations 108 and the permissions 110, if any, granted to the application 104 making the request.

The general implementations 106 represent the implementations for services that can be "plugged in" to or interfaced with the framework 102. Each general implementation 106 implements a particular type of service. For example, one general implementation may implement the "Blowfish" encryption algorithm, while another may implement the DES encryption algorithm. Each general implementation 106 is unrestricted. That is, regardless of the presence of limitations 108 or permissions 110, the general implementations 106 themselves are not hampered by restrictions. In the case where the general implementations 106 are implementations of encryption algorithms, this means that the encryption algorithms may be set to full strength. As will be explained below, it is the framework 102, not the general implementations 106, that ensures that the proper restrictions are enforced on the services provided to the applications 104.

Figure 2:
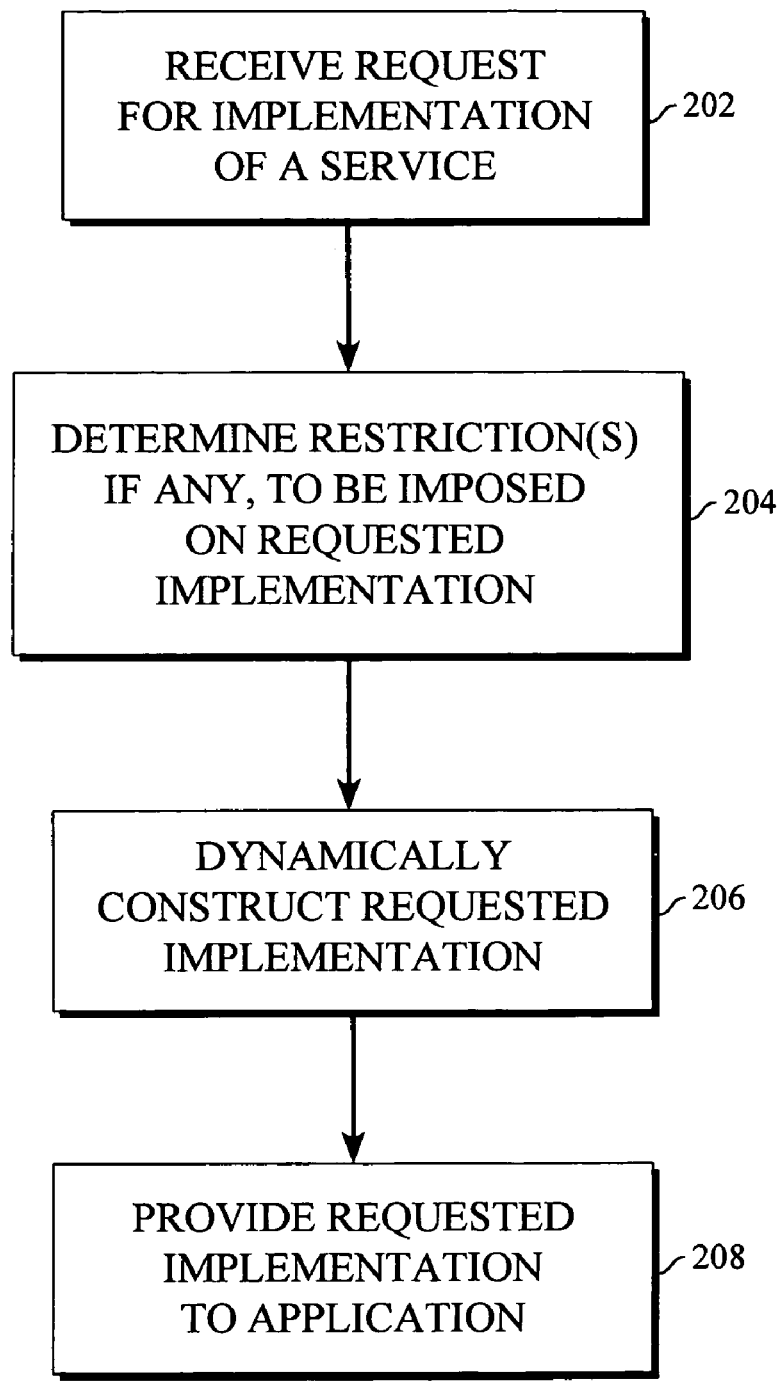
FIG. 2 is a flow diagram illustrating the general operation of the overall system of FIG. 1.

In system 100, the framework 102 is the component responsible for coordinating the overall operation of the system 100. A flowchart illustrating the general operation of the framework 102 is shown in FIG. 2. As shown in FIG. 2, the framework 102 operates by receiving (202) a request from an application 104 for an implementation of a particular type of service (e.g. an implementation for the "Blowfish" encryption algorithm). In response, the framework 102 determines (204) what restrictions, if any, need to be imposed on the requested implementation. In one embodiment, the framework 102 determines the restrictions by reconciling the specified limitations 108 with the permissions 110, if any, granted to the application 104 making the request. In doing so, the framework 102 attempts, in one embodiment, to impose the lowest level of restriction possible. Put another way, the framework 102 tries to be as permissive as possible in light of the permissions 110 and the limitations 108.

Once the restrictions are determined, the framework 102 dynamically constructs (206) the requested implementation. In one embodiment, the requested implementation is constructed by finding an associated general implementation 106 which implements the type of service requested (e.g. a general implementation 106 which implements the "Blowfish" encryption algorithm). Once found, the associated general implementation 106 is incorporated into the requested implementation, along with the restrictions determined previously. In addition, a set of enforcement logic is also incorporated into the requested implementation. This enforcement logic ensures that the restrictions are enforced on the associated general implementation 106. Thus, even though the associated general implementation 106 itself may not have any restrictions, the enforcement logic causes the proper restrictions to be enforced on the associated general implementation 106. With the associated general implementation, the restrictions, and the enforcement logic incorporated therein, the construction of the requested implementation is complete. Since the requested implementation is constructed specifically for the requesting application 104, and hence, may incorporate restrictions specific to the requesting application, the requested implementation may be viewed as a customized implementation which is customized for the requesting application 104.

Once the customized implementation is constructed, it is provided (208) to the requesting application 104. Thereafter, the application 104 may directly request services from the customized implementation. Since the customized implementation incorporates the restrictions and enforcement logic for enforcing the restrictions, it is not necessary for the application 104 to further interact with the framework 102. The customized implementation itself will provide the services, and will guarantee that the restrictions are enforced on the services. By dynamically constructing customized implementations in this manner, the framework 102 ensures that the necessary restrictions are enforced on the services provided to the application 104.

Figure 3A:
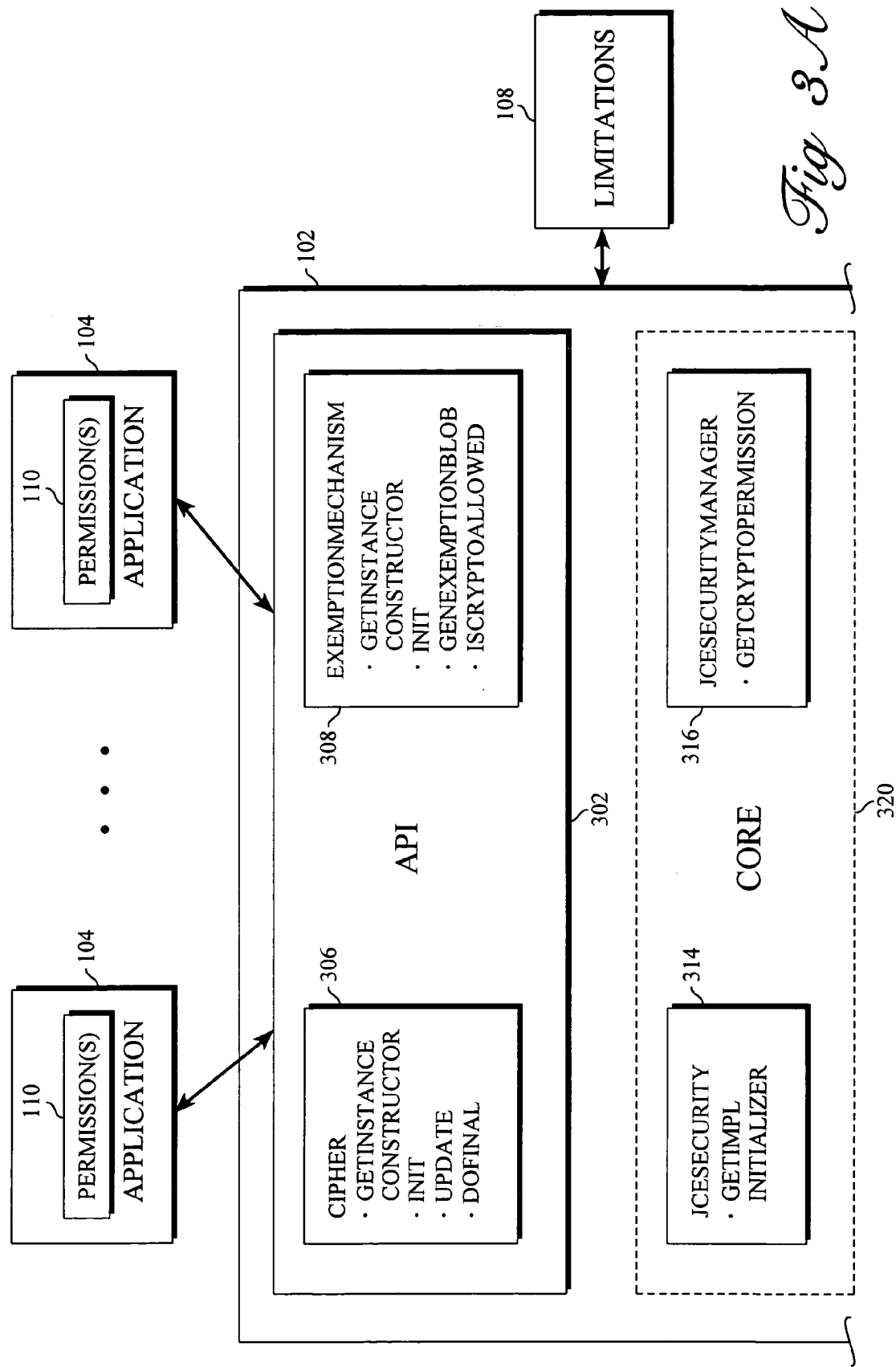
FIG. 3 is a detailed block diagram of one possible embodiment of the present invention.
Figure 3B:
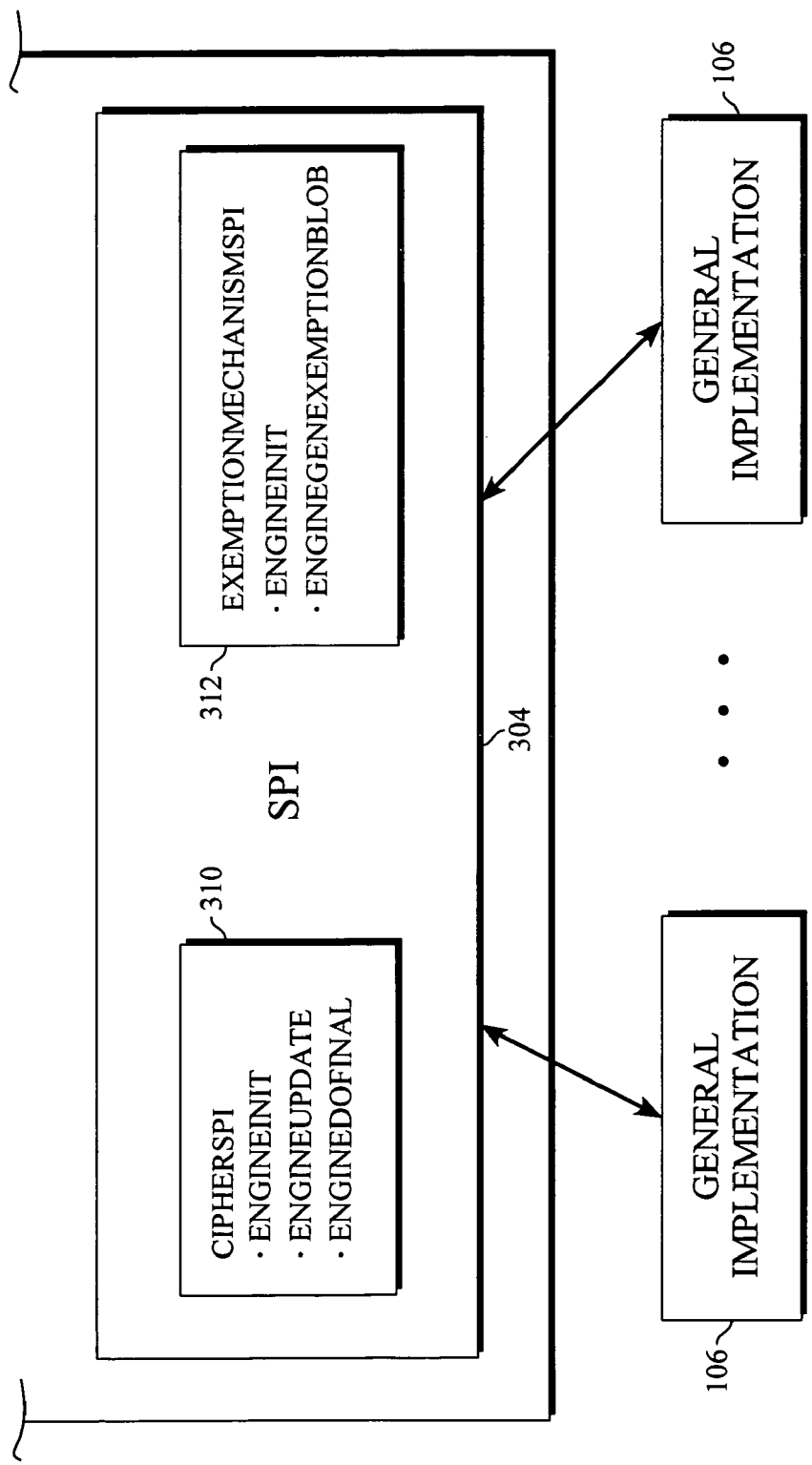

The above discussion provides a general overview of the present invention. With reference to FIG. 3, one possible embodiment of the invention will now be described in detail. In the following discussion, the invention will be described with reference to an object oriented implementation in which the services requested and provided are cryptographic services. It should be noted that this is for illustrative purposes only. The invention is not so limited. Rather, the invention may be applied generally to any type of programming environment and any type of service on which restrictions need to be enforced.

FIG. 3 shows the framework 102 in greater detail. As shown, the framework 102 comprises an application programming interface (API) 302, a service provider interface (SPI) 304, and a core 320. The API 302 represents the resources that the applications 104 can call or invoke directly. In one embodiment, the API 302 comprises a Cipher object class 306 and an ExemptionMechanism object class 308. Among other methods, the Cipher object class 306 comprises a GetInstance method and an Init method. GetInstance is the method that is called by an application 104 when the application requests an implementation of a service. In response to this method call, an instance of the Cipher object class 306 is constructed and returned to the calling application 104. The Cipher instance that is returned is customized for the calling application, and contains restrictions and enforcement logic for enforcing the restrictions on the services that the Cipher instance can provide. Once returned, the methods of the Cipher instance are invoked directly by the calling application 104. One of the methods that needs to be invoked by the calling application 104 is the Init method. This method initializes the Cipher instance and prepares it for operation. In addition, the Init method acts as the enforcement logic for enforcing the restrictions on the Cipher instance. The GetInstance and Init methods will be described in greater detail in a later section.

As mentioned previously, it is sometimes permissible to implement encryption algorithms with greater cryptographic strength (e.g. with larger key sizes) if one or more exemption mechanisms (such as key escrow, key recovery, or key weakening) are implemented. If an exemption mechanism is implemented, then the ExemptionMechanism object class 308 comes into play. This class provides several methods that can be called. These methods may be called to invoke the functionality of a particular exemption mechanism (e.g. to generate key recovery blocks where the exemption mechanism is key recovery), and to determine whether the necessary operations have been performed (e.g. whether the key recovery blocks have been generated). More will be said about the object classes 306, 308 of the API 302 in a later section.

The SPI 304 provides the interface needed by service providers to plug their service implementations into the framework 102. In one embodiment, the SPI 304 comprises a corresponding SPI 304 object class for each API 302 object class. That is, for the Cipher object class 306 in the API 302, there is a corresponding CipherSpi object class 310 in the SPI 304, and for the ExemptionMechanism object class 308 in the API 302, there is a corresponding ExemptionMechanismSpi object class 312 in the SPI 304. This one to one correspondence makes it simple to map the methods in the API classes 306, 308 to the methods in the SPI classes 310, 312. The significance of this will be made clear in a later section. The SPI object classes 310, 312 are abstract object classes, meaning that while they set forth methods which are to be implemented by the classes, they do not themselves provide any implementations for these methods. It is up to the service providers to provide the implementations. To provide an implementation 106 for a service, a service provider subclasses one of the object classes of the SPI 304, and provides, in the subclass, implementations for all of the defined methods of the SPI class. Thus, the general implementations 106 shown in FIG. 3 are subclasses of the object classes 310, 312 of the SPI 304. Each general implementation 106 may implement a different type of service (e.g. one may implement the Blowfish encryption algorithm while another implements the DES encryption algorithm while another implements the key recovery exemption mechanism), and each general implementation 106 may be implemented without any restrictions. This means that the general implementations 106 may be full strength implementations (e.g. may use unlimited encryption key sizes).

Figure 4A:
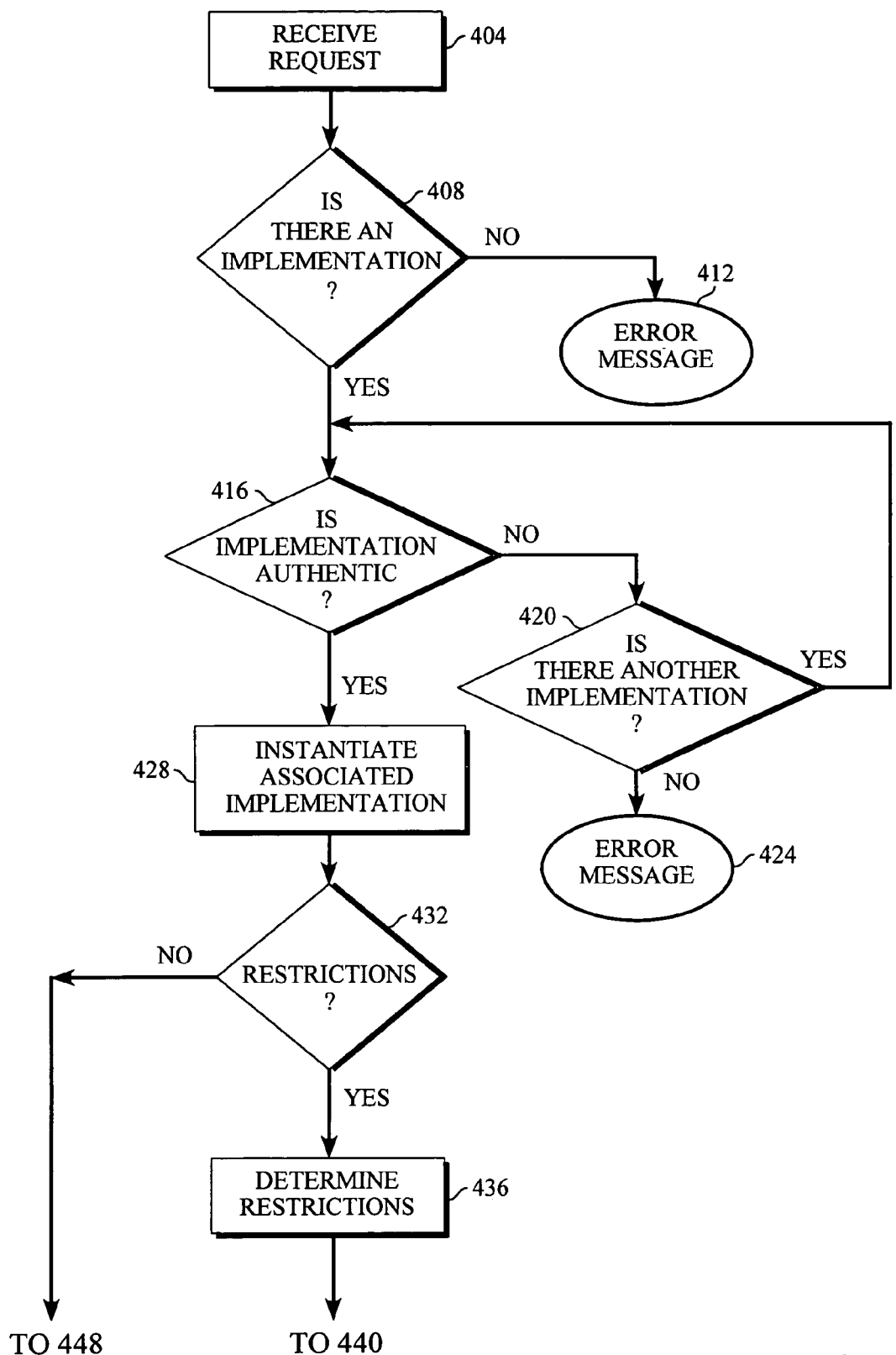
FIG. 4 is a flow diagram illustrating the operation of the embodiment of FIG. 3.
Figure 4B:
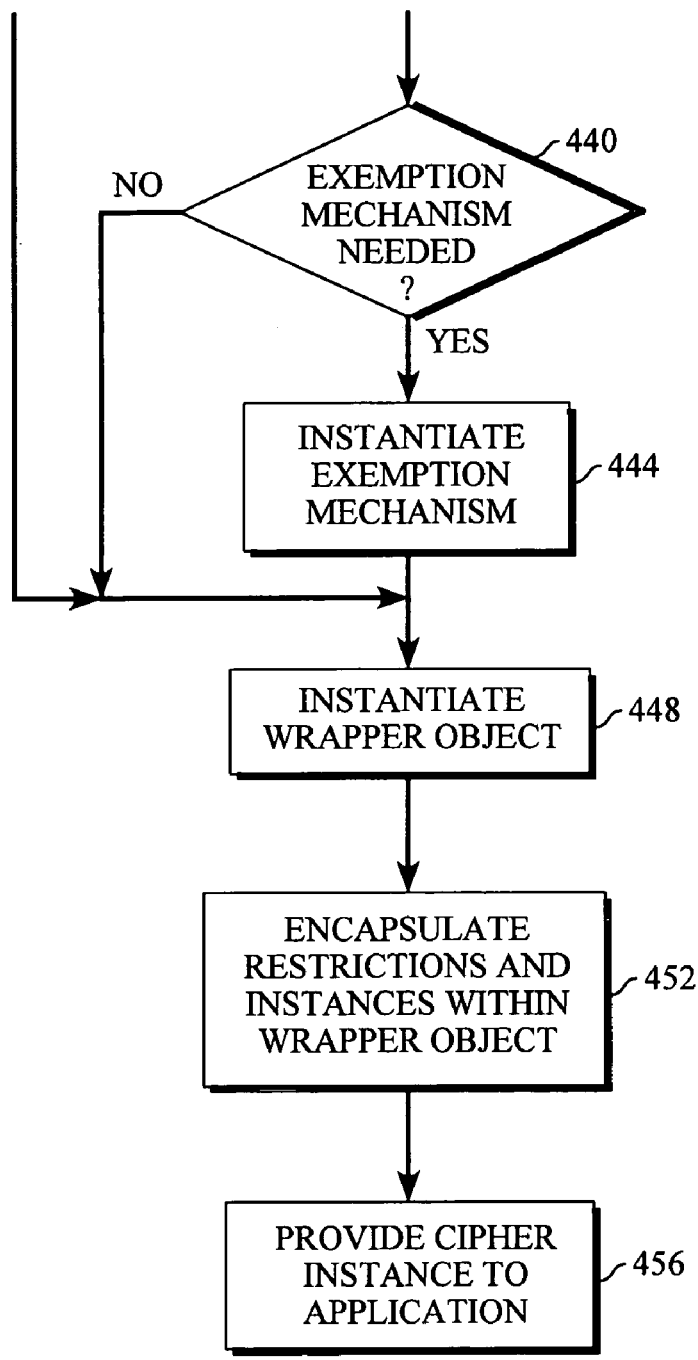

The core 320 of the framework 102 comprises a JCESecurity object class 314 and a JCESecurityManager object class 316. In one embodiment, these object classes 314, 316 are package private and cannot be accessed directly by the applications 104. As shown, the JCESecurity class comprises a GetImpl method, and the JCESecurityManager class comprises a GetCryptoPermission method. These methods are invoked as a result of the invocation of the GetInstance method of the Cipher class 306, and together they perform much of the work needed to dynamically construct a customized implementation. The functions performed by these methods are best understood in the context of the entire system. Thus, with reference to the flow diagram of FIG. 4, the overall operation of the system will now be described to facilitate a complete understanding of the invention.

When an application 104 desires an implementation of a particular encryption service, it makes a request for an implementation by calling the GetInstance method of the Cipher object class 306. Specified in this call is the type of service for which the application is requesting an implementation. In one embodiment, this takes the form of an encryption algorithm name, such as Blowfish. The Cipher class 306 receives (404) this request and invokes the functionality of the GetInstance method. In response, the GetInstance method calls the GetImpl method of the JCESecurity class 314.

The GetImpl method performs several major functions. First, it determines (408) whether a general implementation 106 is available which implements the requested type of service. For example, it determines whether any of the general implementations 106 implements the Blowfish encryption algorithm. If no such general implementation 106 is found, then it returns (412) an error message to the GetInstance method, which in turn, returns an error message to the calling application 104. However, if a general implementation 106 is found which implements the requested service, then the GetImpl method proceeds to determine (416) whether that general implementation is authentic. The manner is which this authentication is carried out will be described in greater detail in a later section, but suffice it to say at this point that the authentication is carried out using a digital signature verification mechanism.

If the GetImpl method determines that the general implementation is not authentic, then it determines (420) whether there is another general implementation 106 which implements the requested service. If not, then the GetImpl method returns (424) an error message to the GetInstance method, which in turn, returns an error message to the calling application 104. If there is another general implementation which implements the requested service, the GetImpl method loops back to (416) to determine whether the new general implementation is authentic. This process continues until either an authentic implementation is found or it is determined that there are no authentic general implementations 106 which implement the requested service.

If an authentic general implementation 106 for the requested service is found (this implementation will be referred to as the associated implementation), then the GetImpl method instantiates (428) the associated implementation to give rise to an implementation instance (i.e. a CipherSpi instance). Thereafter, the GetImpl method determines (432) whether any restrictions need to be imposed on the implementation instance. In one embodiment, this determination is made by determining whether the framework 102 has been set for domestic or global operation. If it has been set for domestic use only, then export regulations do not apply; thus, no restrictions need to be imposed. On the other hand, if the framework 102 is set for global operation, then possible restrictions are to be taken into account.

To determine (436) the restrictions to be imposed on the implementation instance, the GetImpl method calls the GetCryptoPermission method of the JCESecurityManager class 316. The main function of the GetCryptoPermission method is to reconcile the specified limitations 108 with the permissions 110, if any, granted to the calling application 104 to derive a set of restrictions. This set of restrictions is returned by the GetCryptoPermission method to the GetImpl method, and in one embodiment, includes the name of the requested encryption algorithm, the name of the exemption mechanism (if any) that is to be enforced, and some encryption parameters, such as the maximum key size that can be used, and the maximum number of rounds of encryption that can be performed (this is required by some algorithms such as RC5). Upon receiving the restrictions, the GetImpl method determines (440) whether an exemption mechanism is specified in the restrictions. If not, then the GetImpl method proceeds to block (448).

However, if an exemption mechanism is specified, then the GetImpl method proceeds to give rise to an instance of the specified exemption mechanism. In one embodiment, this is achieved by calling the GetInstance method of the ExemptionMechanism class 308, passing along the name of the exemption mechanism. In response to this call, the GetInstance method of the ExemptionMechanism class 308 calls the GetImpl method of the JCESecurity class 314 (notice that this is a second call to the GetImpl method). In response, the GetImpl method searches for a valid general implementation 106 which implements the specified exemption mechanism, and instantiates (444) the general implementation 106 to give rise to an ExemptionMechanismSpi instance. Thereafter, the GetImpl method returns (this is a return from the second call to the GetImpl method) the ExemptionMechanismSpi instance to the GetInstance method of the ExemptionMechanism class 308.

The GetInstance method of the ExemptionMechanism class 308 then invokes the constructor of the ExemptionMechanism class 308, passing to the constructor the ExemptionMechanismSpi instance returned from the GetImpl method. When invoked, the constructor instantiates the ExemptionMechanism class 308, giving rise to an ExemptionMechanism instance. Then, the constructor encapsulates the ExemptionMechanismSpi instance within the ExemptionMechanism instance. In doing so, the constructor maps the methods of the ExemptionMechanism instance to corresponding methods of the ExemptionMechanismSpi instance. In one embodiment, the Init method of the ExemptionMechanism instance is mapped to the EngineInit method of the ExemptionMechanismSpi instance, and the GenExemptionBlob method is mapped to the EngineGenExemptionBlob method. This mapping enables calls to the methods of the ExemptionMechanism instance to be routed to the proper methods of the ExemptionMechanismSpi instance. Once the ExemptionMechanismSpi instance is encapsulated within the ExemptionMechanism instance, the instantiation of the ExemptionMechanism instance is complete.

Thereafter, the GetImpl method returns (this is a return from the first call to the GetImpl method) to the GetInstance method of the Cipher class 306, providing to the GetInstance method the implementation instance, the set of restrictions, and the ExemptionMechanism instance (if any). The GetInstance method of the Cipher class 306 then invokes the constructor of the Cipher class 306, passing to the constructor the implementation instance, the set of restrictions, and the ExemptionMechanism instance (if any) received from the GetImpl method. In response, the constructor instantiates (448) the Cipher class 306 to give rise to a Cipher instance. The constructor then encapsulates (452) the implementation instance, the set of restrictions, and the ExemptionMechanism instance (if any) within the Cipher instance. In effect, the Cipher instance acts as a "wrapper" object. In encapsulating the implementation instance within the Cipher instance, the constructor maps the methods of the Cipher instance to corresponding methods of the implementation instance. In one embodiment, the Init method of the Cipher instance is mapped to the EngineInit method of the implementation instance, the Update method is mapped to the EngineUpdate method, and the DoFinal method is mapped to the EngineDoFinal method. This mapping enables calls to the methods of the Cipher instance to be routed to the proper methods of the implementation instance. This is as it should be since the implementations for these methods are provided by the implementation instance. Once the encapsulation process is complete, the constructor returns to the GetInstance method of the Cipher class 306. In turn, the GetInstance method returns to the calling application 104, providing (456) to the application 104 the newly constructed Cipher instance. Thereafter, the calling application 104 may invoke the methods of the Cipher instance directly.

In one embodiment, one of the first methods that the calling application 104 needs to invoke on the Cipher instance is the Init method. This methods serves to initialize the Cipher instance to prepare it for normal operation. When calling this method, the calling application 104 provides a set of initialization parameters. In one embodiment, these parameters include the encryption key to be used for encryption, and optionally other encryption parameters specifying algorithm-specific properties, such as the number of rounds of encryption (if needed by the particular encryption algorithm).

When called, the Init method compares the initialization parameters passed in by the calling application 104 against the restrictions encapsulated within the Cipher instance. If the initialization parameters are at or below the levels of the restrictions, then the Init method passes the initialization parameters on to the EngineInit method of the implementation instance to enable the implementation instance to initialize. Once the implementation instance is initialized, the Cipher instance is ready for operation; thus, the Update and DoFinal methods of the Cipher instance may be invoked by the calling application 104 to perform encryption/decryption operations. However, if the Init method determines that the initialization parameters passed in by the calling application 104 exceed the levels of the encapsulated restrictions, then it will prevent the initialization parameters from being passed on to the EngineInit method of the implementation instance, thereby, preventing the implementation instance, and hence, the Cipher instance from initializing. If the Cipher instance is not initialized, then it will be incapable of regular operation. Thus, by preventing initialization, the Init method effectively renders the Cipher instance inoperable. In this manner, the Init method acts as enforcement logic for ensuring that the encapsulated restrictions are enforced on the implementation instance.

Where an ExemptionMechanism instance is encapsulated within the Cipher instance, the Init method of the Cipher class 306 performs an additional function. That function is to make sure that the ExemptionMechanism instance has been properly invoked by the application 104 to perform whatever operations are necessary prior to carrying out any data encryption. For example, where the exemption mechanism is key recovery, the ExemptionMechanism instance needs to be invoked to generate and to store key recovery blocks before any data encryption can be performed. To ensure that the necessary operations have been performed by the ExemptionMechanism instance, the Init method calls the IsCryptoAllowed method of the ExemptionMechanism instance. In one embodiment, the ExemptionMechanism instance maintains within itself an indication as to whether its GenExemptionBlob method has been invoked (it is this method that causes the necessary exemption mechanism operations to be performed). This indication can be accessed by calling the IsCryptoAllowed method. If this method indicates that the necessary operations have been performed (i.e. that the GenExemptionBlob method has been invoked), then the Init method will allow the implementation instance, and hence, the Cipher instance to initialize. Otherwise, the Init method will prevent initialization, thereby rendering the Cipher instance inoperable. Thus, not only does the Init method enforce the restrictions on the implementation instance, it also ensures that the exemption mechanism is enforced.

As mentioned above, it is the GetCryptoPermission method of the JCESecurityManager class 316 that determines the restrictions to be imposed on the services provided by the Cipher instance. These restrictions are determined based upon the specified limitations 108 and the permissions 110, if any, granted to the calling application 104. One embodiment of the GetCryptoPermission method will be disclosed below, but before the embodiment is described in detail, a short discussion of the limitations 108 and the permissions 110 will be provided in order to facilitate a complete understanding of the invention.

In one embodiment, the limitations 108 comprises two sets of limitations, a default set and an exempt set. Basically, the default set specifies the default limitations that are to be imposed on encryption algorithms when no exemption mechanisms are implemented, and the exempt set specifies limitations that are to be imposed when certain exemption mechanisms are implemented. In general, if an exemption mechanism is implemented, stronger cryptographic parameters may be used. In one embodiment, both sets of limitations are based upon applicable laws and regulations.

Each set (default or exempt) of limitations comprises zero or more entries. Each entry specifies a particular encryption algorithm, and some limitation(s) to be imposed on that algorithm. The format of the entries in each set of limitations may be the same. In one embodiment, each entry comprises fields or information containers for storing the following information: (1) an encryption algorithm name or identifier; (2) an exemption mechanism name or identifier; (3) a maximum key size; and (4) other algorithm-specific encryption limitations, such as the maximum number of encryption rounds that can be performed. For purposes of the present invention, the entries may take on any desired form. For example, each entry may be implemented as an object having the necessary information encapsulated therein, or each entry may be a set of text within a file. So long as the proper information is provided, any desired form may be used.

With reference to FIG. 5, there is shown a sample of a default set and an exempt set of limitations. Notice that none of the entries in the default set specifies an exemption mechanism, while all of the entries in the exempt set do. This is as it should be since the default set specifies limitations to be imposed when no exemption mechanisms are implemented, and the exempt set specifies limitations to be imposed when certain exemption mechanisms are implemented.

Interpretation of the default set of limitations is straightforward. Basically, each entry sets forth the maximum encryption parameters for a particular encryption algorithm. Thus, according to FIG. 5, for the Blowfish algorithm, a maximum key size of 128 bits can be used. Similarly, for the RC5 algorithm, a maximum key size of 64 bits and a maximum number of encryption rounds of 10 can be used. Interpretation of the exempt set is almost as straightforward. Basically, the first entry of the exempt set indicates that if the key recovery exemption mechanism is implemented in conjunction with the Blowfish algorithm, then an increased maximum key size of 256 bits can be used. Similarly, the second entry indicates that if the key escrow exemption mechanism is implemented in conjunction with the Blowfish algorithm, then an increased maximum key size of 256 bits can be used. Notice that the same algorithm name (Blowfish in this case) can appear in more than one entry in the exempt set. So long as the exemption mechanisms specified in these entries are different, this is permissible.

The specified limitations 108 are just some of the factors taken into account in determining the restrictions imposed on the Cipher instance. Another factor is the permissions 110, if any, granted to the calling application 104. As mentioned previously, some types of applications, such as health care and banking applications, are allowed to use stronger cryptography than others. For these and other applications, the privilege of using stronger cryptography is reflected in the permissions 110 granted to the applications. In one embodiment, the permissions 110 take one of several forms. The first form is a CryptoAllPermission indication. When an application is given CryptoAllPermission, it implies that the application has all possible permissions. In a sense, the application is unrestricted. This is the highest possible permission that can be granted, and as such, it is granted to very few applications.

A lesser permission that can be granted to an application is a permission to implement a particular encryption algorithm with increased or even unlimited cryptographic strength. In one embodiment, this type of permission specifies a particular algorithm name (e.g. Blowfish) and optionally a set of maximum parameters (e.g. a maximum key size). If a set of maximum parameters is specified, then the encryption algorithm may be implemented up to the level of the specified maximum parameters. If a set of maximum parameters is not specified, then the encryption algorithm may be implemented at any level (i.e. the algorithm is unrestricted). Thus, if the permission specifies Blowfish with a max key size of 128 bits, then the application is able to use the Blowfish encryption algorithm with a max key size of 128 bits. If the permission simply specifies Blowfish, then the application is able to use the Blowfish encryption algorithm with an unlimited key size. Thus far, the maximum parameters have been discussed only in terms of a max key size. It should be noted that the maximum parameters may include other parameters, such as the maximum number of encryption rounds. Such other parameters may be required by certain encryption algorithms, such as RC5, and thus may be included with the maximum parameters.

Yet another permission that can be granted to an application is a permission to implement a particular exemption mechanism in conjunction with a particular encryption algorithm (e.g. key recovery with Blowfish). As mentioned previously, implementing an exemption mechanism usually enables an application to use stronger encryption parameters (e.g. larger key sizes). Thus, the permission to implement an exemption mechanism can lead to significantly enhanced cryptographic strength. Whether it actually does or not depends upon the contents of the limitations 108, and whether an implementation for the exemption mechanism is available, as will be discussed below. At this point, it should be noted that an application may be granted more than one permission. For example, it may be allowed to implement more than one type of exemption mechanism. In that and other cases, a single application may have more than one permission granted to it.

Figure 6:
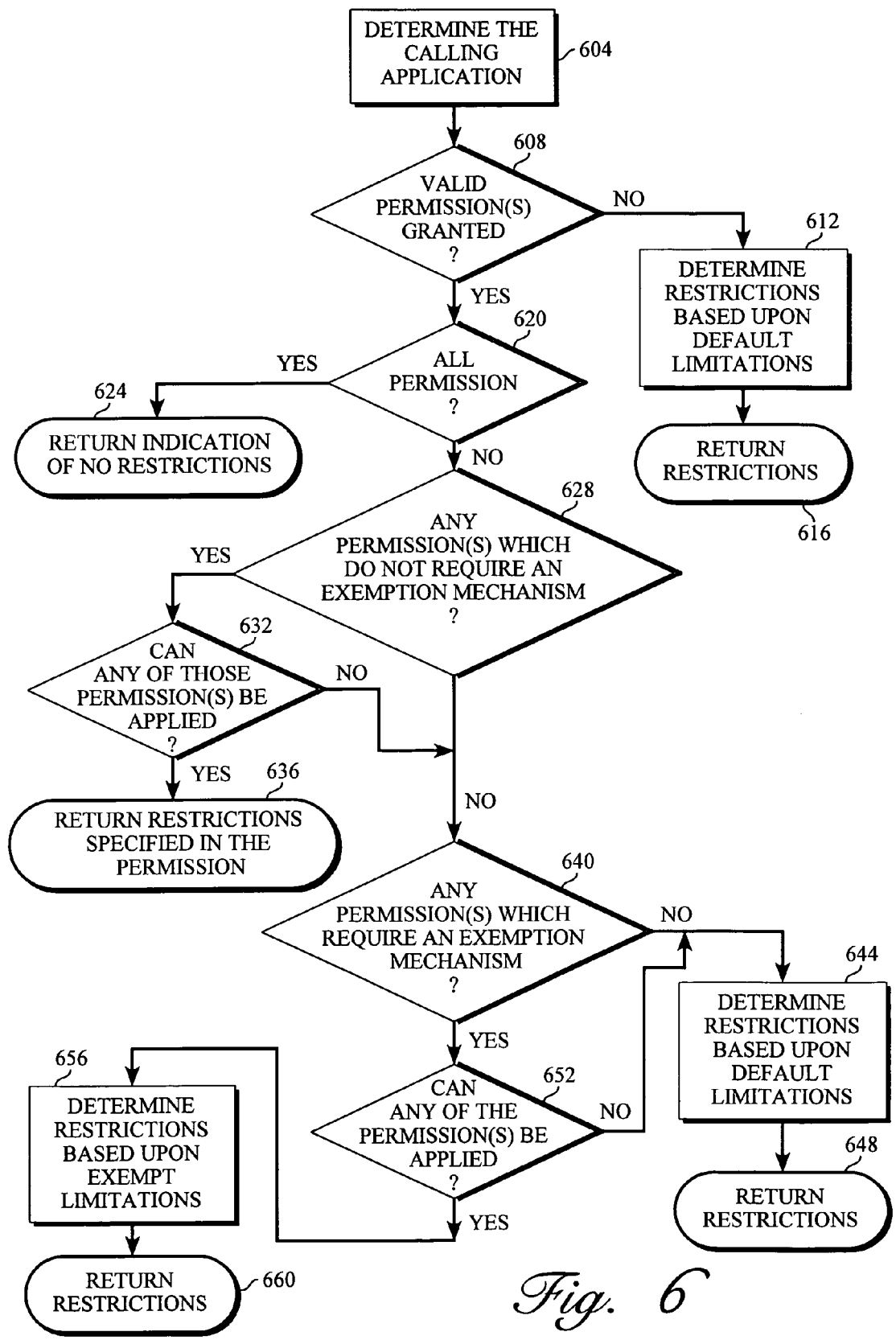
FIG. 6 is a flow diagram illustrating the operation of one embodiment of the GetCryptoPermission method of the JCESecurityManager object class.

With this background information in mind, and with reference to the flow diagram of FIG. 6, the operation of the GetCryptoPermission method of the JCESecurityManager class 316 will now be described. When the GetCryptoPermission method is called, it gets passed to it a set of parameters including the name of the encryption algorithm (e.g. Blowfish) being requested by the calling application 104. In response to the call, the GetCryptoPermission method first determines (604) which application 104 is the calling application. That is, the GetCryptoPermission method determines which application 104 called the GetInstance method that caused the GetCryptoPermission method to be called. In one embodiment, the GetCryptoPermission method makes this determination by traversing the call stack. This involves tracing the call sequence from the GetCryptoPermission method back to the GetImpl method back to the GetInstance method back to the application 104 which made the original GetInstance method call. By traversing the call stack in this manner, the GetCryptoPermission method is able to determine the original calling application 104.

Once the calling application 104 is determined, a determination (608) is made as to whether the calling application 104 has any valid permissions granted thereto. In one embodiment, this is done by first determining whether any permissions have been granted to the application 104 at all. In one embodiment, this determination is made by checking the files associated with the application 104 to see whether any permissions have been included therein. In a Java programming environment, the files of an application are contained in a JAR file, and in such an environment, it is this JAR file that is checked for permissions.

If any permissions are found, then a verification process is carried out to ensure that the permissions are valid. In one embodiment, this verification is performed using digital signatures. More specifically, any application 104 that contains one or more permissions has its JAR file digitally signed. This digital signature provides assurance that the application 104 is from a trusted source, and that its contents have not been altered. If this digital signature is verified, then it means that the permissions contained within the JAR file are valid. Otherwise, the permissions are invalid. The GetCryptoPermission method uses a digital signature verification mechanism to perform this verification. For purposes of the present invention, any effective digital signature verification mechanism may be used.

If the GetCryptoPermission method determines that the calling application 104 has no valid permissions, then the GetCryptoPermission method determines (612) the restrictions to be imposed on the Cipher instance based upon the limitations in the default set of limitations. More specifically, the GetCryptoPermission method searches through the entries in the default set for an entry having the same algorithm name as the encryption algorithm being requested by the calling application 104. Once that entry is found, the restrictions are derived from the limitations (e.g. max key size and other limitations) specified in that entry. For example, if the calling application 104 is requesting an implementation for the Blowfish algorithm, then according to the sample in FIG. 5, the restrictions would be: Blowfish with max key size of 128 bits. Once the restrictions are determined, they are returned (616) by the GetCryptoPermission method to the GetImpl method of the JCESecurity class 314.

Returning to (608), if the GetCryptoPermission method determines that the calling application 104 does have one or more valid permissions, then the GetCryptoPermission method determines (620) whether any of those permissions is a CryptoAllPermission. If so, then the application 104 is unrestricted, in which case, the GetCryptoPermission method returns (624) an indication of no restrictions to the GetImpl method. However, if none of the permissions is a CryptoAllPermission, then the GetCryptoPermission method proceeds to (628).

By the time (628) is reached, it is known that the application 104 has one or more valid permissions and that none of those permissions is a CryptoAllPermission. Thus, it means that the permissions are of one of two types: (1) the type that does not require an exemption mechanism to be enforced (i.e. the type that specifies a particular encryption algorithm and optionally a set of maximum parameters); or (2) the type that does require an exemption mechanism to be enforced (i.e. the type that specifies a particular exemption mechanism in conjunction with a certain encryption algorithm). At (628), the GetCryptoPermission method determines whether any of the permissions is of the type that does not require an exemption mechanism to be enforced. If any of the permissions are of this type, then for each of those permissions, a determination (632) is made as to whether that permission can be applied. A permission can be applied if the encryption algorithm specified in the permission is the same as the encryption algorithm being requested by the application 104. For example, if the application 104 is requesting an implementation for the Blowfish algorithm, then a permission applies if it specifies the Blowfish algorithm. In one embodiment, at most one permission can be applied. If the GetCryptoPermission method determines that one of the permissions applies, then the GetCryptoPermission method determines the restrictions to be imposed on the Cipher instance based upon the maximum parameters (if any) specified in the permission. That is, if a set of maximum parameters is specified in the permission, then the restrictions are determined based upon the specified maximum parameters. If a set of maximum parameters is not specified, then the restrictions are determined to be unlimited, in which case the encryption algorithm is unrestricted. Once the restrictions are determined, they are returned (636) by the GetCryptoPermission method to the GetImpl method of the JCESecurity class 314.

Returning to (632), if the GetCryptoPermission method determines that it cannot apply any of the permissions that do not require an exemption mechanism to be enforced, then it proceeds to (640). At (640), the GetCryptoPermission method determines whether any of the permissions granted to the application 104 is of the type that requires an exemption mechanism to be enforced. If no such permission is found, then the GetCryptoPermission method uses the default set of limitations to determine (644) the restrictions to be imposed on the Cipher instance. The manner of determining the restrictions is the same as that described above in connection with (612). Once the restrictions are determined, they are returned (648) by the GetCryptoPermission method to the GetImpl method.

On the other hand, if the GetCryptoPermission method determines that at least one of the permissions granted to the application 104 is of the type that requires an exemption mechanism to be enforced, then it proceeds to (652). At (652), the GetCryptoPermission method determines whether any of the permissions that requires an exemption mechanism to be enforced can be applied. More specifically, the GetCryptoPermission method determines which of those permissions apply to the encryption algorithm being requested, and for each that applies, whether that particular encryption algorithm/exemption mechanism combination is allowed, and whether an implementation for the specified exemption mechanism is available. In carrying out these functions, the GetCryptoPermission method refers to the exempt set of limitations. These operations are best understood with reference to an example.

Suppose that the encryption algorithm being requested is the Blowfish algorithm, and that the application has been granted two permissions: (1) key weakening in conjunction with Blowfish; and (2) key recovery in conjunction with Blowfish. Suppose further that the exempt set of limitations is that shown in FIG. 5. In this example, both permissions apply to the algorithm being requested since both relate to Blowfish; thus, both permissions will be processed, beginning with the first. The first permission allows key weakening to be used in conjunction with Blowfish. To determine whether this permission can be used, the GetCryptoPermission method searches through the exempt set for an entry having this combination. The exempt set contains two entries for Blowfish, but neither of these entries specifies key weakening as the exemption mechanism. Thus, because the combination of Blowfish with key weakening is not explicitly allowed by the exempt set of limitations, this permission cannot be used or applied.

That being the case, the GetCryptoPermission method proceeds to the next permission which permits key recovery to be used in conjunction with Blowfish. This permission is processed in the same manner as the first, namely, by searching through the entries in the exempt set. This time, an entry is found which allows the specified combination of Blowfish with key recovery. As a result, this permission may potentially be used/applied. However, the inquiry does not end there. Before the GetCryptoPermission method allows the permission to be used, the GetCryptoPermission method determines whether a valid implementation for the specified exemption mechanism (key recovery in this example) is available. If not, then the permission cannot be applied. In making this determination, the GetCryptoPermission method searches for a valid general implementation 106 (FIG. 3) which implements the specified exemption mechanism. By the end of this process (652), the GetCryptoPermission method will know whether any of the granted permissions can be applied.

If the GetCryptoPermission method determines that a permission can be applied, then the GetCryptoPermission method uses the exempt rather than the default set of limitations to determine (656) the restrictions to be imposed on the Cipher instance. More specifically, the GetCryptoPermission method derives the restrictions from the entry in the exempt set having the same algorithm name and exemption mechanism as the permission. In the example given, the entry is the first entry in the exempt set, and the restrictions are: Blowfish with key recovery with a max key size of 256 bits. Once these restrictions are determined, they are returned (660) by the GetCryptoPermission method to the GetImpl method of the JCESecurity class 314. As noted above, the entries in the exempt set typically allow stronger cryptographic parameters to be used than the default set. Thus, by deriving the restrictions from the exempt set, the GetCryptoPermission method enhances the cryptographic strength of the Cipher instance.

Returning to (652), if none of the permissions can be applied, then the GetCryptoPermission method uses the default set of limitations to determine (644) the restrictions to be imposed on the Cipher instance. The manner of determining the restrictions is the same as that described above in connection with (612). Thus, the application 104 is treated the same as if it had been granted no permissions at all. Once the restrictions are determined, they are returned (648) by the GetCryptoPermission method to the GetImpl method. In the manner described, the GetCryptoPermission method determines the restrictions to be imposed on the Cipher instance. By trying to apply the permissions first, and then using the default limitations only when none of the permissions apply, the GetCryptoPermission method tries to grant the Cipher instance the greatest cryptographic strength possible given the limitations. Put another way, the GetCryptoPermission method attempts to impose the lowest level of restrictions possible.

It was previously mentioned that the default and exempt sets of limitations that comprise the overall set of limitations 108 (FIG. 1) are based upon applicable laws and regulations. In one embodiment, they are derived based upon at least two sets of laws and regulations: (1) U.S. export laws; and (2) local laws (the laws of the country or locality into which the framework 102 is imported). Because these sets of laws often differ, in order to derive a single set of limitations consistent with both sets of laws, a reconciliation process is performed. In one embodiment, this reconciliation process takes the form of a merge. More specifically, the two sets of laws are merged to produce the resultant set of limitations 108, and the merger is performed in such a way that the resultant limitations 108 comprise the most restrictive limitations of the two sets of laws. By selecting the most restrictive limitations, the merging process ensures that the resultant limitations 108 comply with both sets of laws.

Figure 7:
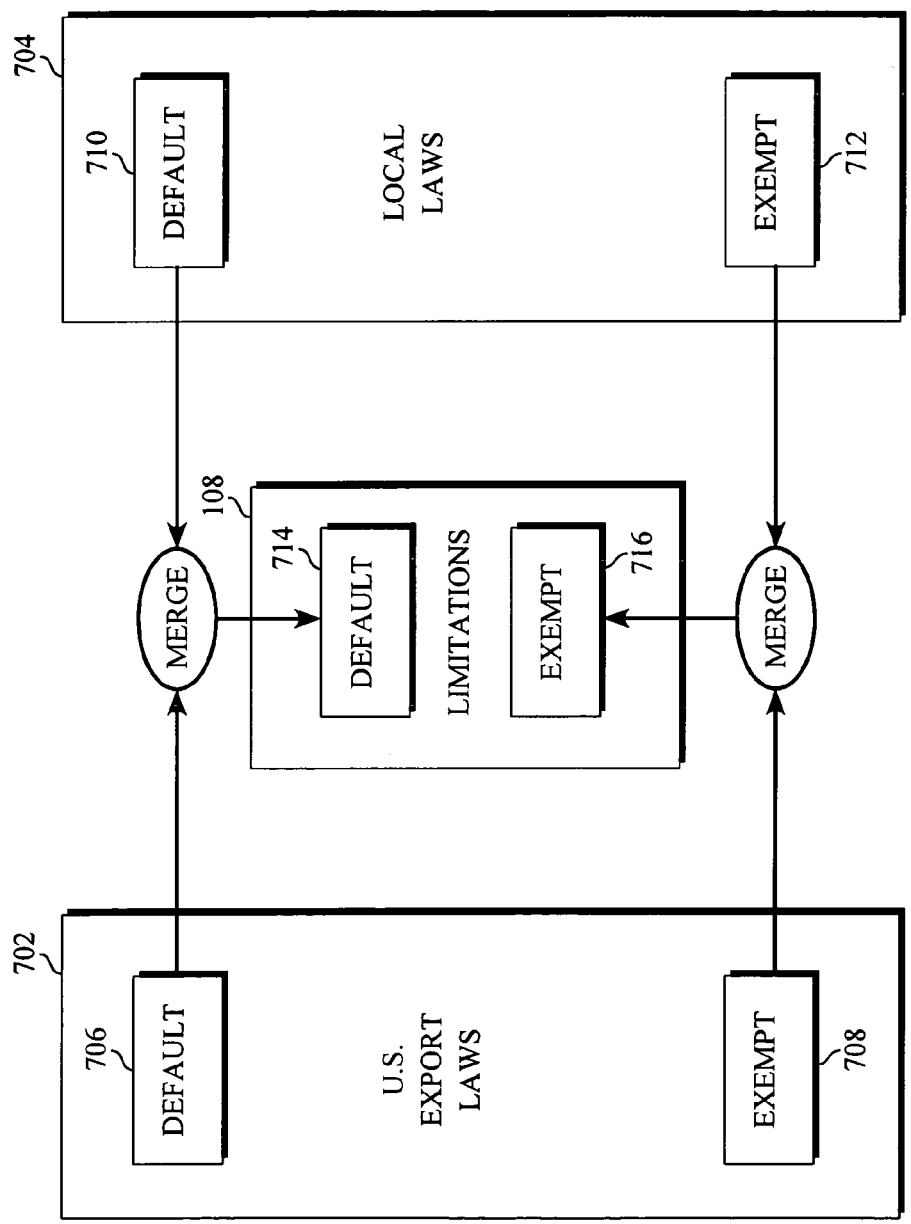
FIG. 7 depicts an overview of the process of merging multiple sets of laws into a single set of limitations in accordance with one embodiment of the present invention.

FIG. 7 shows an overview of the merging process. As shown, the U.S. export laws 702 comprise a default component 706 and an exempt component 708. Likewise, the local laws 704 comprise a default component 710 and an exempt component 712. The default components 706, 710 specify the default limitations that are to be imposed on encryption algorithms when no exemption mechanisms are implemented, and the exempt components 708, 712 specify the limitations that are to be imposed when certain exemption mechanisms are implemented. In one embodiment, the default 706, 710 and exempt 708, 712 components have the same format as the default 714 and exempt 716 sets of limitations described previously in connection with FIG. 5. That is, each component 706, 710, 708, 712 comprises zero or more entries, and each entry comprises a field or container for storing: (1) an encryption algorithm name or identifier;

(2) an exemption mechanism name or identifier; (3) a maximum key size; and (4) other encryption limitations. To derive the resultant limitations 108, the default components 706, 710 are merged, entry by entry, to give rise to the default set 714 of resultant limitations 108, and the exempt components 708, 712 are merged, entry by entry, to give rise to the exempt set 716 of resultant limitations 108. Once derived, the resultant limitations 108 may be used by the GetCryptoPermission method of the JCESecurityManager class 316 to determine the restrictions to be imposed on the Cipher instance.

With reference to the flow diagram of FIG. 8, one embodiment of the merging process will now be described. In the following discussion, reference will be made to policies A, B and C. Policies A and B refer to the information sources of the merge (e.g. the U.S. export laws and the local laws) while policy C refers to the result of the merge (e.g. the resultant limitations 108). As shown in FIG. 7, the default components 706, 710 and the exempt components 708, 712 are merged separately in separate merging operations. However, it should be noted the same merging process may be used for both merges.

Figure 8A:
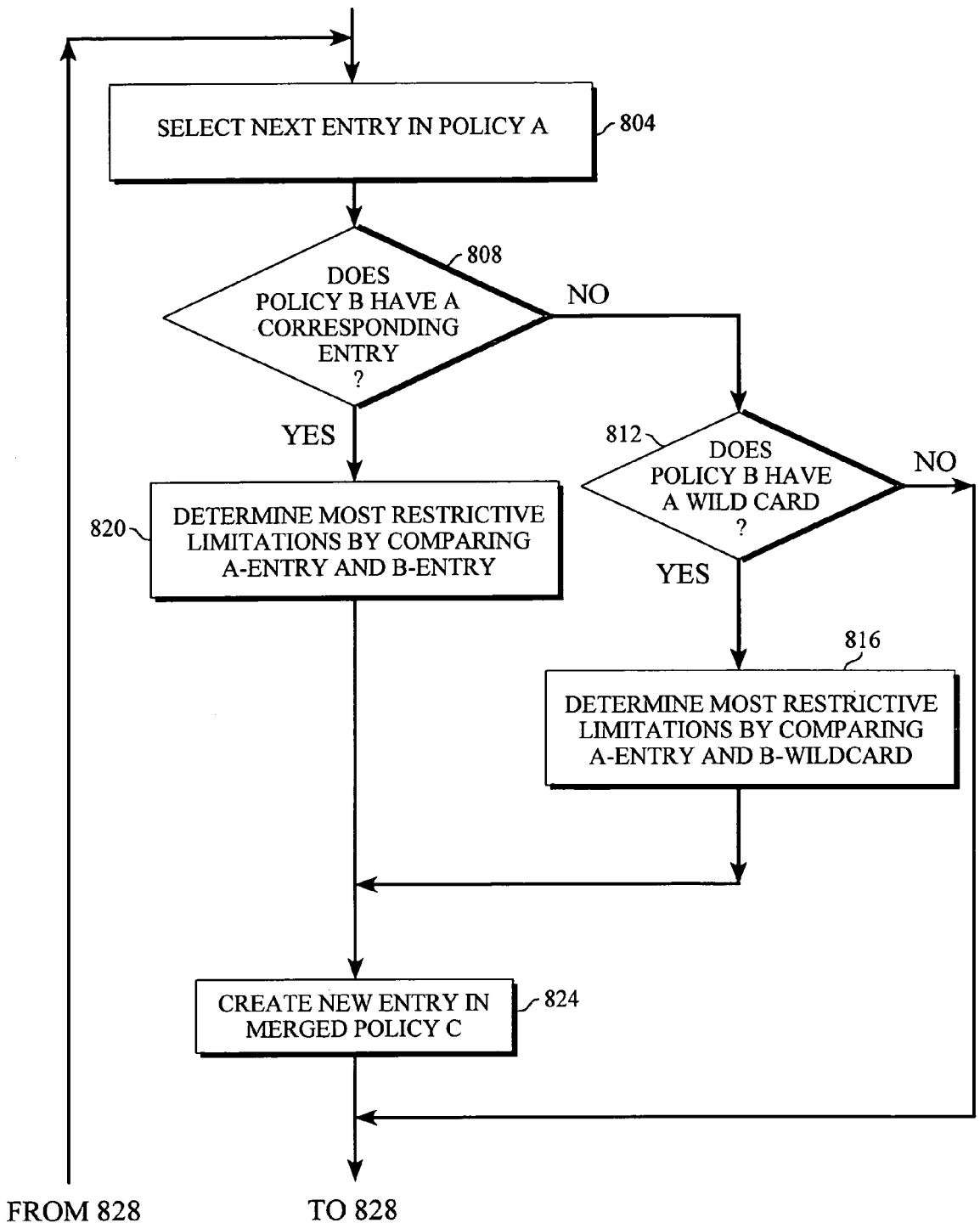
FIG. 8 is a flow diagram illustrating the manner in which multiple sets of laws are merged into a single set of limitations in accordance with one embodiment of the present invention.
Figure 8B:
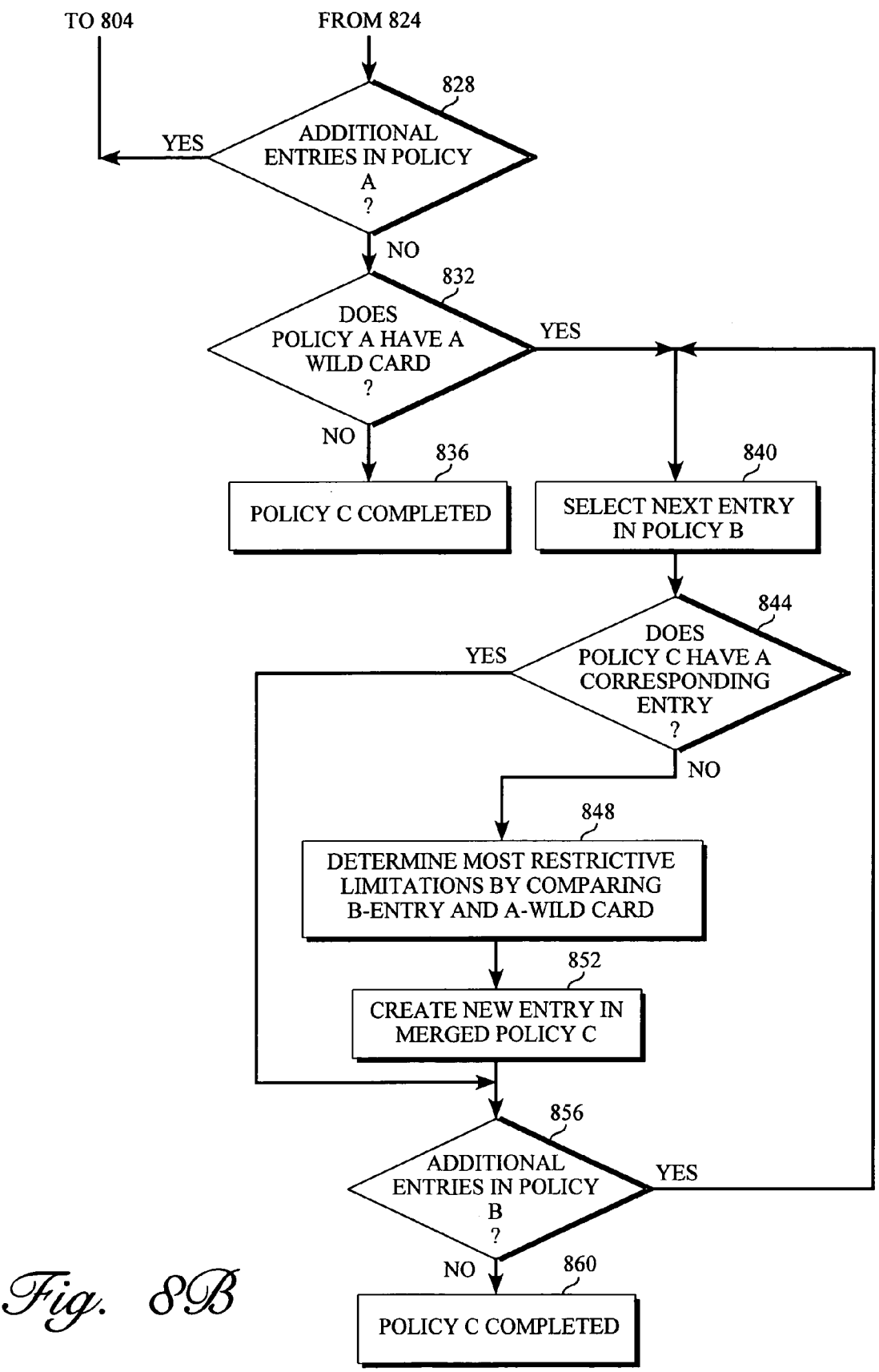

Referring now to FIG. 8, the merging process begins with selecting (804) the next entry (in this case, the first entry) in policy A. The selected entry is compared with the entries in policy B to determine (808) whether there is a corresponding entry in policy B. In one embodiment, this determination is made by comparing the algorithm name and the exemption mechanism name of the selected entry with the algorithm name and the exemption mechanism name of the entries in policy B. If any entry in policy B has the same combination of algorithm name and exemption mechanism name, then a corresponding entry is found. In such a case, the limitations of the two corresponding entries are compared to determine (820) the most restrictive limitations.

As an example of how this is done, suppose that both policies A and B have an entry with RC5 as the algorithm name and no named exemption mechanism. Suppose that the entry in policy A has a max key size of 64 bits and a maximum number of rounds of 12, while the entry in policy B has a max key size of 128 bits and a maximum number of rounds of 10. In such a case, the most restrictive limitations would be a max key size of 64 bits and a maximum number of rounds of 10. Thus, as this example illustrates, the most restrictive limitations are determined on a limitation by limitation basis.

Once the most restrictive limitations are determined, a new entry is created (824) in policy C. This new entry will have the same algorithm name and exemption mechanism name as the two corresponding entries. In addition, it will have as its limitations the most restrictive limitations determined in (820). Once the new entry is created in policy C, processing of the current selected entry is complete. Thus, a determination (828) is made as to whether there are any more entries in policy A. If so, then the process loops back to (804) to select and process the next entry in policy A. Otherwise, the process proceeds to (832).

Returning to (808), if it is determined that there is no entry in policy B which corresponds to the selected entry in policy A, then a determination (812) is made as to whether policy B has a wildcard entry. This wildcard entry acts as a catchall for all of the algorithm name/exemption mechanism combinations that are not explicitly listed in policy B. If no wildcard entry is found in policy B, then processing of the selected entry is complete. No new entry will be created in policy C, and the process proceeds to (828) to look for more entries in policy A.

On the other hand, if it is determined that policy B does have a wildcard entry, then the limitations of the selected entry are compared with the limitations of the wildcard entry to determine (816) the most restrictive limitations. This determination is made in the same manner as that described above in connection with (820). Once the most restrictive limitations are determined, a new entry is created (824) in policy C. This new entry will have the same algorithm name and exemption mechanism name as the selected entry. In addition, it will have as its limitations the most restrictive limitations determined in (816). Once the new entry is created in policy C, processing of the current selected entry is complete. Thus, a determination (828) is made as to whether there are any more entries in policy A. If so, then the process loops back to (804) to select and process the next entry in policy A. This process continues until all of the entries in policy A have been processed.

Once all of the entries in policy A have been processed, it is time to process all of the entries in policy B which did not correspond to entries in policy A. Before doing this, however, a determination (832) is made as to whether policy A has a wildcard entry. If policy A does not have a wildcard entry, then there is no point in processing the additional entries in policy B since these entries would not result in additional entries being created in policy C. Thus, if policy A has no wildcard entry, the construction of policy C is completed (836).

On the other hand, if policy A has a wildcard entry, then processing of policy B begins with selecting (840) the next entry (the first entry in this case) in policy B. The selected entry is compared with the entries in policy C to determine (844) whether there is a corresponding entry in policy C. In one embodiment, this determination is made by comparing the algorithm name and the exemption mechanism name of the selected entry with the algorithm name and the exemption mechanism name of the entries in policy C. If a corresponding entry is found in policy C, then it means that the selected entry was already processed as part of the processing of the entries of policy A. In such a case, no further processing of the selecting entry is needed. As a result, the process proceeds to (856) to look for more entries in policy B.

On the other hand, if the selected entry does not correspond to any of the entries in policy C, then the limitations of the selected entry are compared with the limitations of the wildcard entry of policy A to determine (848) the most restrictive limitations. This determination is made in the same manner as that described above in connection with (820). Once the most restrictive limitations are determined, a new entry is created (852) in policy C. This new entry will have the same algorithm name and exemption mechanism name as the selected entry. In addition, it will have as its limitations the most restrictive limitations determined in (848). Once the new entry is created in policy C, processing of the current selected entry is complete. Thus, a determination (856) is made as to whether there are any more entries in policy B. If so, then the process loops back to (840) to select and process the next entry in policy B. This process continues until all of the entries in policy B have been processed. Once that is done, the construction of policy C is completed (860).

In one embodiment, the merging process just described is carried out by the initializer of the JCESecurity class 314. This initializer is invoked the very first time the JCESecurity class 314 is invoked. When invoked, it merges two or more sets of laws provided to it to give rise to an overall set of limitations 108. It is this overall set of limitations 108

(comprising a default set and an exempt set) that is thereafter used by the GetCryptoPermission method to determine the restrictions to be imposed on a Cipher instance.

It was previously mentioned that it is the GetImpl method of the JCESecurity class 314 that is responsible for instantiating an associated general implementation 106 to give rise to an implementation instance. As part of the instantiation process, the GetImpl method carries out an authentication process. In one embodiment, this authentication process takes the form of mutual authentication whereby the GetImpl method authenticates the associated general implementation 106, and the associated general implementation 106 authenticates the framework 102. In one embodiment, to make it possible for this mutual authentication to take place: (1) the JAR file of the associated general implementation 106 is digitally signed; (2) the JAR file of the framework 102 is digitally signed; (3) the JCESecurity class 314 has embedded within it a set of obfuscated trusted public keys which can be used to verify the signature of the associated general implementation's JAR file; and (4) the associated general implementation 106 has embedded within it a set of trusted public keys which can be used to verify the signature of the framework's JAR file.

Given this foundation, the mutual authentication is carried out as follows. First, using the obfuscated trusted public keys embedded within the JCESecurity class 314, the GetImpl method verifies the digital signature of the associated general implementation's JAR file. If this digital signature is verified, then the GetImpl method instantiates the associated general implementation 106, causing the constructor of the associated general implementation to be invoked. When invoked, the constructor verifies the digital signature of the framework's JAR file using the trusted public keys embedded within the associated general implementation 106. If the constructor determines that the digital signature of the framework's JAR file is authentic, then it will construct the requested implementation instance. Otherwise, it will return an error. As this discussion shows, an implementation instance will be constructed only if both the associated general implementation 106 and the framework 102 are authenticated.

In carrying out this authentication process, the GetImpl method relies upon an external digital signature verification mechanism. That is, in one embodiment, the GetImpl method does not perform the signature verification itself. Rather, it submits the digital signature of the associated general implementation 106 and the obfuscated trusted public keys to an external digital signature verification mechanism for verification. In one embodiment, the external digital signature verification mechanism is the Signature Mechanism of the Java Runtime. While this Signature Mechanism is part of the overall Java environment, it is not a part of the framework 102. Thus, from the point of view of the framework 102, it is not a "trusted" component. As a result, before it can be relied upon to provide accurate and reliable results, the Signature Mechanism itself is verified to ensure that it is legitimate (i.e. that it is performing the proper verification function).

Figure 9:
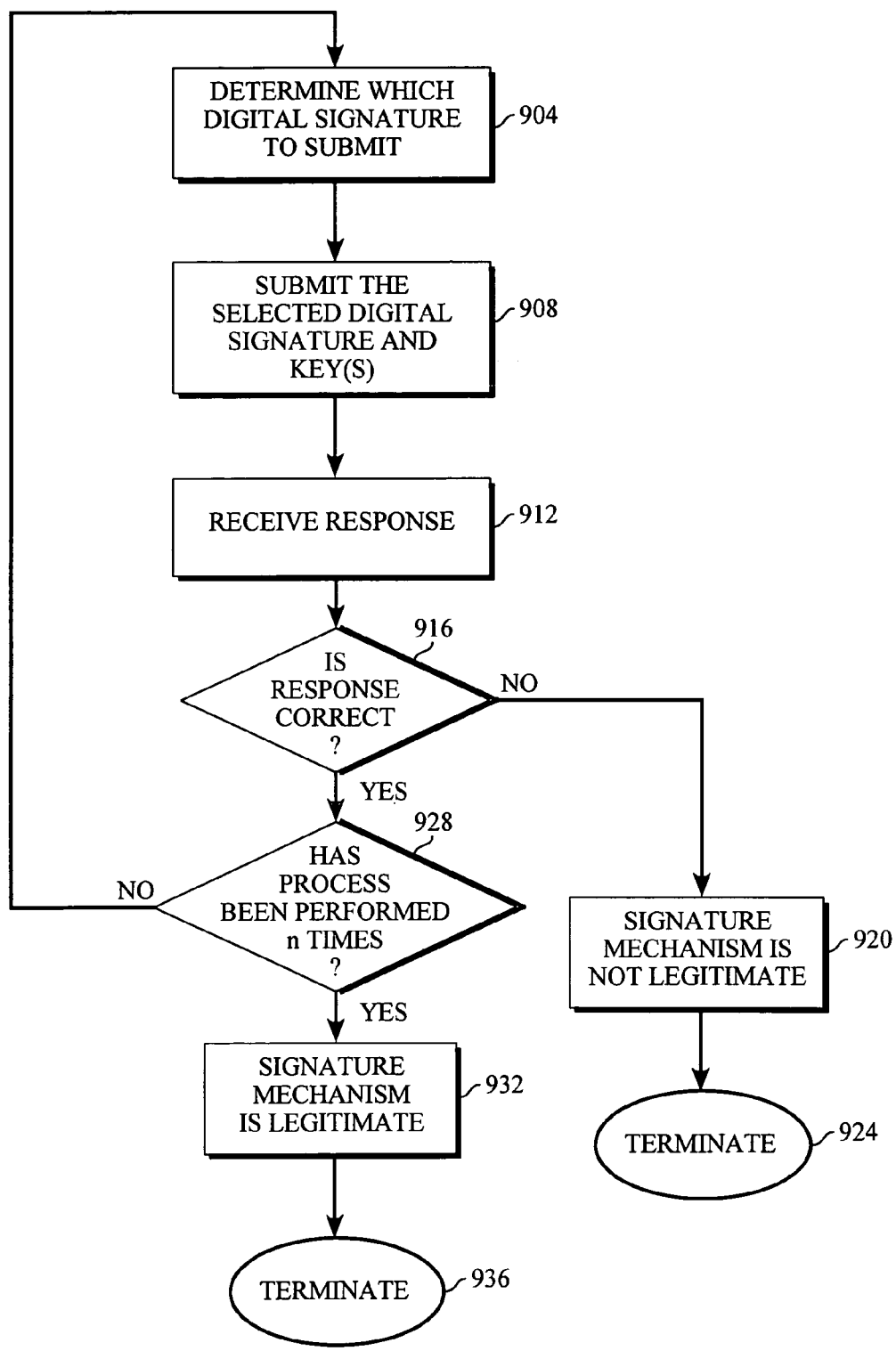
FIG. 9 is a flow diagram illustrating the manner in which an untrusted digital signature verification mechanism may be tested for legitimacy in accordance with one embodiment of the present invention.

To enable it to verify the Signature Mechanism, the JCESecurity class 314 has embedded within it at least two digital signatures, one that is known to be verifiable using the obfuscated trusted public keys, and another that is known to be unverifiable using the obfuscated trusted public keys. These signatures are submitted to the Signature Mechanism in an unpredictable sequence to test the legitimacy of the Mechanism. One possible embodiment of the process for testing the Signature Mechanism is shown in FIG. 9.

As shown, the verification process begins with determining (904) which digital signature (the verifiable one or the unverifiable one) to submit to the Signature Mechanism. This determination is made in a manner that is unpredictable to the Signature Mechanism, and in one embodiment, is made using a random process. For example, a random number is generated, and if the random number is within a certain range (e.g. is equal to 0), then one of the signatures will be selected, and if the random number is within another range (e.g. is equal to 1), then the other signature will be selected. In one embodiment, the determination (904) also takes into account which signatures were previously selected. If all previous selections were of the same signature, then (904) causes the other signature to be selected. This ensures that each of the two signatures is selected at least once to fully test the legitimacy of the Signature Mechanism.

Once one of the signatures has been selected, the selected signature and the obfuscated trusted public keys are submitted (908) to the Signature Mechanism for verification. In turn, the Signature Mechanism provides a response indicating either that the signature was verified or that the signature was not verified. This response is received (912) and checked (916) for accuracy. More specifically, if the signature submitted to the Signature Mechanism was the verifiable one, the response is checked for an indication that the signature was verified. If the signature submitted to the Signature Mechanism was the unverifiable one, the response is checked for an indication that the signature was unverified. If the response received is not correct for the signature that was submitted, then it is determined (920) that the Signature Mechanism is not legitimate. In such a case, the verification process is terminated (924).

On the other hand, if the response received is correct for the signature submitted, then a determination (928) is made as to whether the verification process has been performed an n number of times, where n is any desired number (e.g. 5). If not, then the process loops back to (204) to once again submit a signature to the Signature Mechanism and to test the response. If the process has been performed an n number of times, then the process proceeds to (932). By the time (932) is reached, it is known that the Signature Mechanism has provided a correct response to each and every submitted signature (otherwise, the process would have terminated at (924) before reaching (932)). Thus, it is determined (32) that the Signature Mechanism is legitimate. In such a case, the Signature Mechanism may be relied upon by the GetImpl method to authenticate the associated general implementation 106. Once the Signature mechanism is verified to be legitimate, the verification process is terminated (936).

The result of the above process is that the verifiable and unverifiable digital signatures are submitted to the Signature Mechanism in an unpredictable sequence. By making the submission sequence unpredictable, the verification process makes it highly difficult if not impossible for an illegitimate Signature Mechanism to "fake" proper responses. Therefore, this verification process provides an effective means for testing the legitimacy of the external Signature Mechanism.

Figure 10:
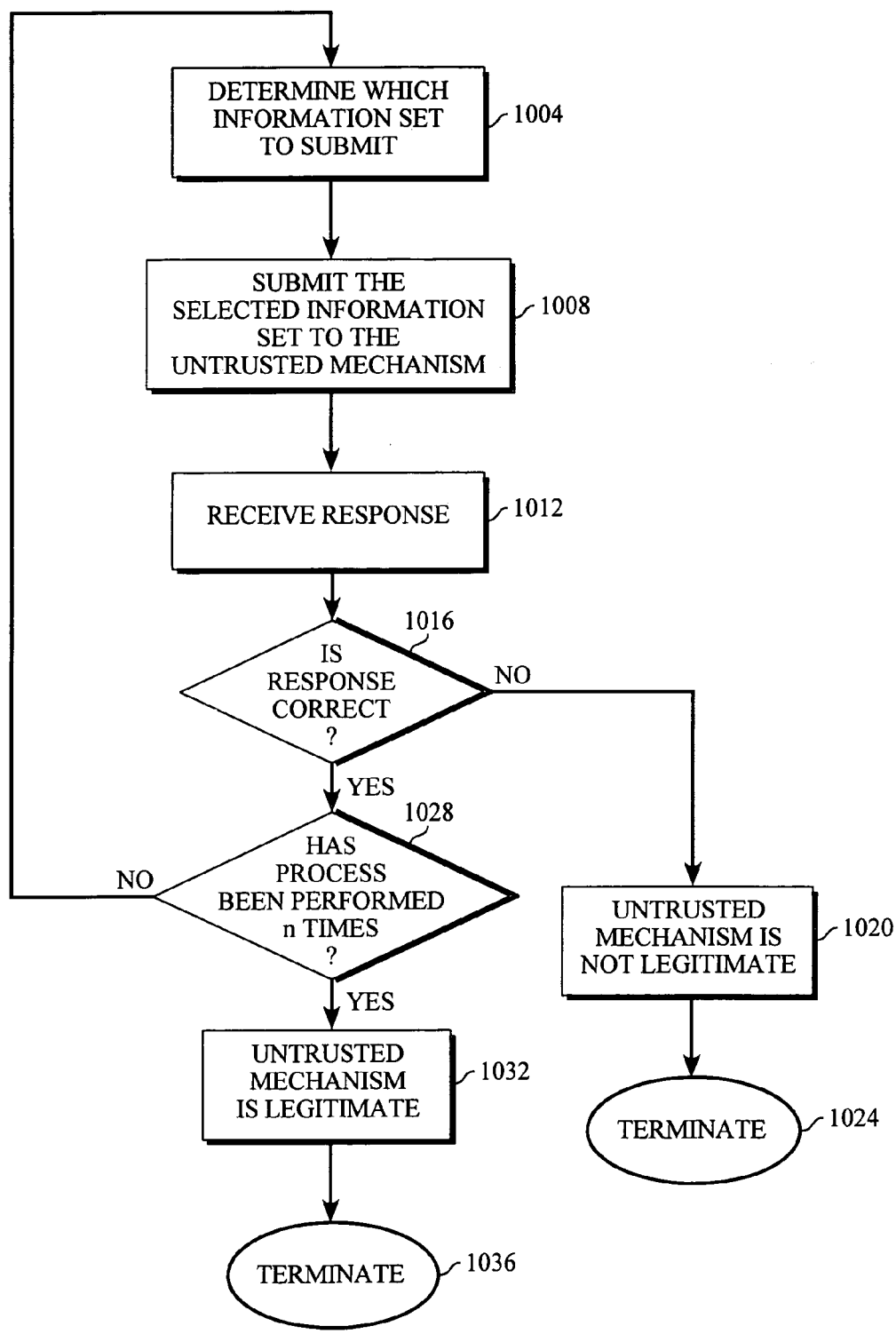
FIG. 10 is a flow diagram illustrating the manner in which any untrusted mechanism may be tested for legitimacy in accordance with one embodiment of the present invention.

Thus far, the verification process has been described with reference to a digital signature verification mechanism. It should be noted, however, that the process is not so limited. Rather, it may be applied generally to test the legitimacy of any untrusted mechanism. So long as there are at least two different sets of information the correct responses for which are known, the process may be applied to test the legitimacy of the untrusted mechanism. To illustrate how the verification process may be applied generally to any untrusted mechanism, reference will be made to the flow diagram of FIG. 10.

As shown, the verification process begins with determining (1004) which of at least two sets of information to submit to the untrusted mechanism. This determination (1004) is made in a manner that is unpredictable to the untrusted mechanism, and in one embodiment, is made using a random process. For example, a random number is generated, and if the random number is within a certain range (e.g. is equal to 0), then a first set of information will be selected, and if the random number is within another range (e.g. is equal to 1), then another set of information will be selected. In one embodiment, the determination (1004) also takes into account which sets of information were previously selected. If all previous selections were of the same information set, then (1004) causes the other information set to be selected. This ensures that each of the two information sets is selected at least once to fully test the legitimacy of the untrusted mechanism.

Once one of the information sets has been selected, the selected information set is submitted (1008) to the untrusted mechanism. In turn, the untrusted mechanism provides a response to the submitted information set. This response is received (1012) and checked (1016) for accuracy. More specifically, the proper response to each information set is known. If the response received is not the correct response for the information set submitted, then it is determined (1020) that the untrusted mechanism is not legitimate. In such a case, the verification process is terminated (1024).

On the other hand, if the response received is the correct response for the information set submitted, then a determination (1028) is made as to whether the verification process has been performed an n number of times, where n is any desired number (e.g. 5). If not, then the process loops back to (1004) to once again submit an information set to the untrusted mechanism and to test the response. If the process has been performed an n number of times, then the process proceeds to (1032). By the time (1032) is reached, it is known that the untrusted mechanism has provided a correct response to each and every submitted information set (otherwise, the process would have terminated at (1024) before reaching (1032)). Thus, it is determined (1032) that the untrusted mechanism is legitimate. Once the untrusted mechanism is verified to be legitimate, the verification process is terminated (1036).

The result of the above process is that the two information sets are submitted to the untrusted mechanism in an unpredictable sequence. By making the submission sequence unpredictable, the verification process makes it highly difficult if not impossible for an illegitimate untrusted mechanism to "fake" proper responses. Therefore, this verification process provides an effective means for testing the legitimacy of any untrusted mechanism.

HARDWARE OVERVIEW

Figure 11:
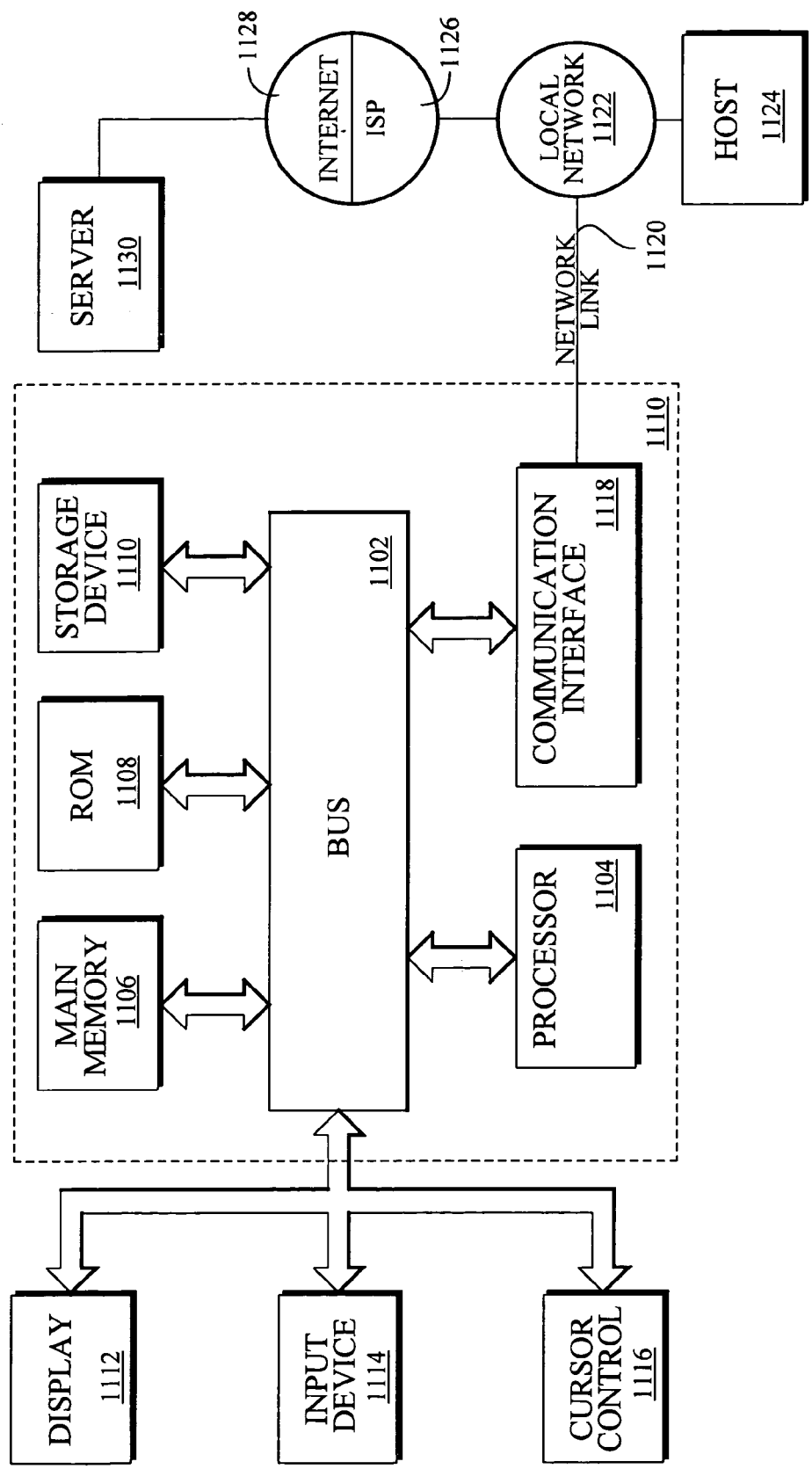
FIG. 11 is a hardware block diagram of a computer system in which the present invention may be implemented.

In one embodiment, the present invention is implemented as a set of instructions executable by one or more processors. The invention may be implemented as part of an object oriented programming system, including but not limited to the Java™ programming system manufactured by Sun Microsystems, Inc. of Mountain View, Calif. FIG. 11 shows a hardware block diagram of a computer system 1100 in which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 may also be further used to store temporary variables or other intermediate information during execution of instructions by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

According to one embodiment, the functionality of the present invention is provided by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution. In this manner, computer system 1100 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

The invention claimed is:

1. A method for verifying the legitimacy of an untrusted signature verification mechanism, comprising:

submitting a first signature and a second signature to an untrusted signature verification mechanism in a sequence that is unpredictable to the untrusted mechanism, said first signature being known to be verifiable, and said second signature being known to be unverifiable;

receiving a response from the untrusted mechanism for each submission of either said first signature or said second signature;

determining whether each response received from the untrusted mechanism is a correct response; and in response to a determination that any of the responses from the untrusted mechanism is an incorrect response, determining the untrusted mechanism to not be legitimate.

2. The method of claim 1, wherein said sequence is generated randomly.

3. The method of claim 2, wherein said sequence is generated using a random number generator.

4. The method of claim 1, wherein said sequence includes at least one submission of said first signature and at least one submission of said second signature.

5. The method of claim 1, wherein determining whether each response received from the untrusted mechanism is a correct response comprises:

where the signature submitted to the untrusted mechanism was said first signature, determining whether the response from the untrusted mechanism is that said first signature is verified; and where the signature submitted to the untrusted mechanism was said second signature, determining whether the response from the untrusted mechanism is that said second signature is not verified.

6. An apparatus for verifying the legitimacy of an untrusted signature verification mechanism, comprising:

a mechanism for submitting a first signature and a second signature to an untrusted signature verification mechanism in a sequence that is unpredictable to the untrusted mechanism, said first signature being known to be verifiable, and said second signature being known to be unverifiable;

a mechanism for receiving a response from the untrusted mechanism for each submission of either said first signature or said second signature;

a mechanism for determining whether each response received from the untrusted mechanism is a correct response; and a mechanism for determining, in response to a determination that any of the responses from the untrusted mechanism is an incorrect response, the untrusted mechanism to not be legitimate.

7. The apparatus of claim 6, wherein said sequence is generated randomly.

8. The apparatus of claim 7, wherein the mechanism for submitting comprises a random number generator.

9. The apparatus of claim 6, wherein said sequence includes at least one submission of said first signature and at least one submission of said second signature.

10. The apparatus of claim 6, wherein the mechanism for determining whether each response received from the untrusted mechanism is a correct response comprises:

a mechanism for determining, where the signature submitted to the untrusted mechanism was said first signature, whether the response from the untrusted mechanism is that said first signature is verified; and a mechanism for determining, where the signature submitted to the untrusted mechanism was said second signature, whether the response from the untrusted mechanism is that said second signature is not verified.

11. A computer readable medium having stored thereon instructions which, when executed by one or more processors, cause the one or more processors to verify the legitimacy of an untrusted signature verification mechanism, said computer readable medium comprising:
  instructions for causing one or more processors to submit a first signature and a second signature to an untrusted signature verification mechanism in a sequence that is unpredictable to the untrusted mechanism, said first signature being known to be verifiable, and said second signature being known to be unverifiable;
  instructions for causing one or more processors to receive a response from the untrusted mechanism for each submission of either said first signature or said second signature;
  instructions for causing one or more processors to determine whether each response received from the untrusted mechanism is a correct response; and
  instructions for causing one or more processors to determine, in response to a determination that any of the responses from the untrusted mechanism is an incorrect response, the untrusted mechanism to not be legitimate.

12. The computer readable medium of claim 11, wherein said sequence is generated randomly.

13. The computer readable medium of claim 12, wherein said sequence is generated using a random number generator.

14. The computer readable medium of claim 11, wherein said sequence includes at least one submission of said first signature and at least one submission of said second signature.

15. The computer readable medium of claim 11, wherein the instructions for causing one or more processors to determine whether each response received from the untrusted mechanism is a correct response comprises:
  instructions for causing one or more processors to determine, where the signature submitted to the untrusted mechanism was said first signature, whether the response from the untrusted mechanism is that said first signature is verified; and
  instructions for causing one or more processors to determine, where the signature submitted to the untrusted mechanism was said second signature, whether the response from the untrusted mechanism is that said second signature is not verified.

* * * * *

UNITED STATES PATENT AND TRADEMARK OFFICE
CERTIFICATE OF CORRECTION

PATENT NO. : 7,103,910 B1
APPLICATION NO. : 09/483726
DATED : September 5, 2006
INVENTOR(S) : Sharon Liu et al.

It is certified that error appears in the above-identified patent and that said Letters Patent is hereby corrected as shown below:

TITLE PAGE (56) REFERENCES CITED
U.S. PATENT DOCUMENTS

Please insert --

| | | | |
|---|---|---|---|
| 5,323,464 | 6/21/94 | Elander et al. | 380/24 |
| 5,412,727 | 5/2/95 | Fischer | 380/4 |
| 5,745,572 | 4/28/98 | Press | 380/21 |
| 5,883,956 | 3/16/99 | Le et al. | 380/4 |
| 5,907,620 | 5/25/99 | Klemba et al. | 380/25 |
| 5,933,503 | 8/3/99 | Schell et al. | 380/25 |
| 6,125,446 | 9/26/00 | Olarig et al. | 713/200 |
| 6,178,504 | 1/23/01 | Fieres et al. | 713/164 |
| 6,308,266 | 10/23/01 | Freeman | 713/156 |
| 6,389,534 | 3/14/02 | Elgamal et al. | 713/164-- |

TITLE PAGE
FOREIGN PATENT DOCUMENTS

Please insert --

| | | |
|---|---|---|
| EP 0 539 726 A2 | International Business Machines Corporation | 5-5-1993 |
| EP 0 828 208 A2 | Hewlett-Packard Company | 3-11-1998-- |

OTHER PUBLICATIONS

TITLE PAGE (56) REFERENCES CITED

OTHER PUBLICATIONS

Please insert --
    Java Cryptography Extension 1.2.1, Java Cryptography Extension 1.2.1 API Specification & Reference, downloaded 5/10/02, http://java.sun.com/products/jce/doc/guide/API_users_guide.html, pages 1-51.

Java (TM) Crytography Extension (JCE), Java Cryptography Extension (JCE), http://java.sun.com/products/jce/index.html, downloaded 5/10/02, 5 pages.

Susan Landau, et al., "CRYPTO POLICY PERSPECTIVES," Communications of the ACM, August 1994, Vol. 37, No. 8, XP-002253003, pages 115-121.

UNITED STATES PATENT AND TRADEMARK OFFICE
CERTIFICATE OF CORRECTION

PATENT NO. : 7,103,910 B1
APPLICATION NO. : 09/483726
DATED : September 5, 2006
INVENTOR(S) : Sharon Liu et al.

It is certified that error appears in the above-identified patent and that said Letters Patent is hereby corrected as shown below:

Fausto Rabitti et al., "A Model of Authorization for Next-Generation Database Systems", ACM Transactions on Database Systems, Vol. 16, No. 1, March 1991, XP-002254871, pages 88-131.--

Signed and Sealed this

Thirteenth Day of February, 2007

JON W. DUDAS
*Director of the United States Patent and Trademark Office*